US012628197B2

(12) United States Patent
Chitrakar et al.

(10) Patent No.: US 12,628,197 B2
(45) Date of Patent: May 12, 2026

(54) COMMUNICATION APPARATUS AND COMMUNICATION METHOD FOR WIRELESS LOCAL AREA NETWORK SENSING

(71) Applicant: Panasonic Intellectual Property Corporation of America, Torrance, CA (US)

(72) Inventors: Rojan Chitrakar, Singapore (SG); Lei Huang, Singapore (SG); Yoshio Urabe, Nara (JP); Rajat Pushkarna, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 443 days.

(21) Appl. No.: 18/041,773

(22) PCT Filed: Jun. 10, 2021

(86) PCT No.: PCT/SG2021/050335
§ 371 (c)(1),
(2) Date: Feb. 15, 2023

(87) PCT Pub. No.: WO2022/039669
PCT Pub. Date: Feb. 24, 2022

(65) Prior Publication Data
US 2023/0319877 A1 Oct. 5, 2023

(30) Foreign Application Priority Data
Aug. 18, 2020 (SG) ............................ 10202007921U

(51) Int. Cl.
*H04W 74/0808* (2024.01)
*H04L 43/062* (2022.01)

(52) U.S. Cl.
CPC ....... *H04W 74/0808* (2013.01); *H04L 43/062* (2013.01)

(58) Field of Classification Search
CPC ............. H04W 74/0808; H04W 8/005; H04W 8/24; H04W 48/16; H04W 24/10; H04W 84/12; H04W 24/08; H04W 28/18; H04L 43/062

(Continued)

(56) References Cited

U.S. PATENT DOCUMENTS

| | | | | |
|---|---|---|---|---|
| 2011/0205968 | A1* | 8/2011 | Kim ..................... | H04W 72/542 |
| | | | | 370/328 |
| 2019/0261303 | A1 | 8/2019 | Wei et al. | |
| 2019/0297518 | A1* | 9/2019 | Chen ..................... | H04W 24/10 |

(Continued)

FOREIGN PATENT DOCUMENTS

| | | |
|---|---|---|
| CN | 108024198 A | 5/2018 |

OTHER PUBLICATIONS

Gan et al., "Backward compatible EHT trigger frame," doc.: IEEE 802.11-20/0840-00-00be, Jun. 1, 2020, 10 pages.

(Continued)

*Primary Examiner* — Nicholas A Jensen
*Assistant Examiner* — Oladiran Gideon Olaleye
(74) *Attorney, Agent, or Firm* — Seed Intellectual Property Law Group LLP

(57) ABSTRACT
The present disclosure provides a communication apparatus and method for wireless local area network sensing. The communication apparatus comprises: a transmitter, which, in operation, transmits a request frame to one or more peer communication apparatuses, the request frame carrying transmission parameters to be used by the each of one or more peer communication apparatuses to transmit a physical layer protocol data unit (PPDU) used for channel measurements; a sensing module configured to perform the channel measurements based on the respective PPDU(s) received (Continued)

100 from the one or more peer communication apparatuses; and an interface configured to obtain sensing parameters from higher layer applications and pass a result of the channel measurements to the higher layer applications.

15 Claims, 31 Drawing Sheets

(58) Field of Classification Search
USPC ......................................................... 370/329
See application file for complete search history.

(56) References Cited

U.S. PATENT DOCUMENTS

| | | | | |
|---|---|---|---|---|
| 2020/0213160 A1 | 7/2020 | Doostnejad et al. | | |
| 2021/0045093 A1* | 2/2021 | Rao | ....................... | H04W 76/14 |
| 2022/0330059 A1* | 10/2022 | Yang | ..................... | H04B 7/024 |
| 2023/0224955 A1* | 7/2023 | Jang | ..................... | H04W 80/10 |
| | | | | 370/338 |

OTHER PUBLICATIONS

Huang et al., "Discussion on EHT PPDU Formats," doc.: IEEE 802.11-20/0031r2, Jan. 16, 2020, 11 pages.

Singaporean Office Action, dated Mar. 18, 2024, for Singaporean Application No. 11202301036S, 8 pages.

Atif et al., "Wi-ESP-A tool for CSI-based Device-Free Wi-Fi Sensing (DFWS)," *Journal for Computational Design and Engineering* 7(5):644-656, May 15, 2020.

Da Silva et al., "A Channel Measurement Procedure for WLAN Sensing," IEEE 802.11-20/0842r0, Jun. 3, 2020. (14 pages).

Han, "WLAN sensing SG March and Apr. 2020, teleconference call agenda," IEEE 802.11-20/0532r1, Mar. 24, 2020. (31 pages).

International Search Report, mailed Sep. 17, 2021, for International Patent Application No. PCT/SG2021/050335. (4 pages).

Chen et al., "Overview of WLAN sensing protocol," doc .: IEEE 802.11-20/1232r0, Intel, Aug. 16, 2020. (11 pages).

Hearing Notice, dated Feb. 2, 2026, for Indian Patent Application No. 202317008819. (2 pages)(with English Translation).

* cited by examiner

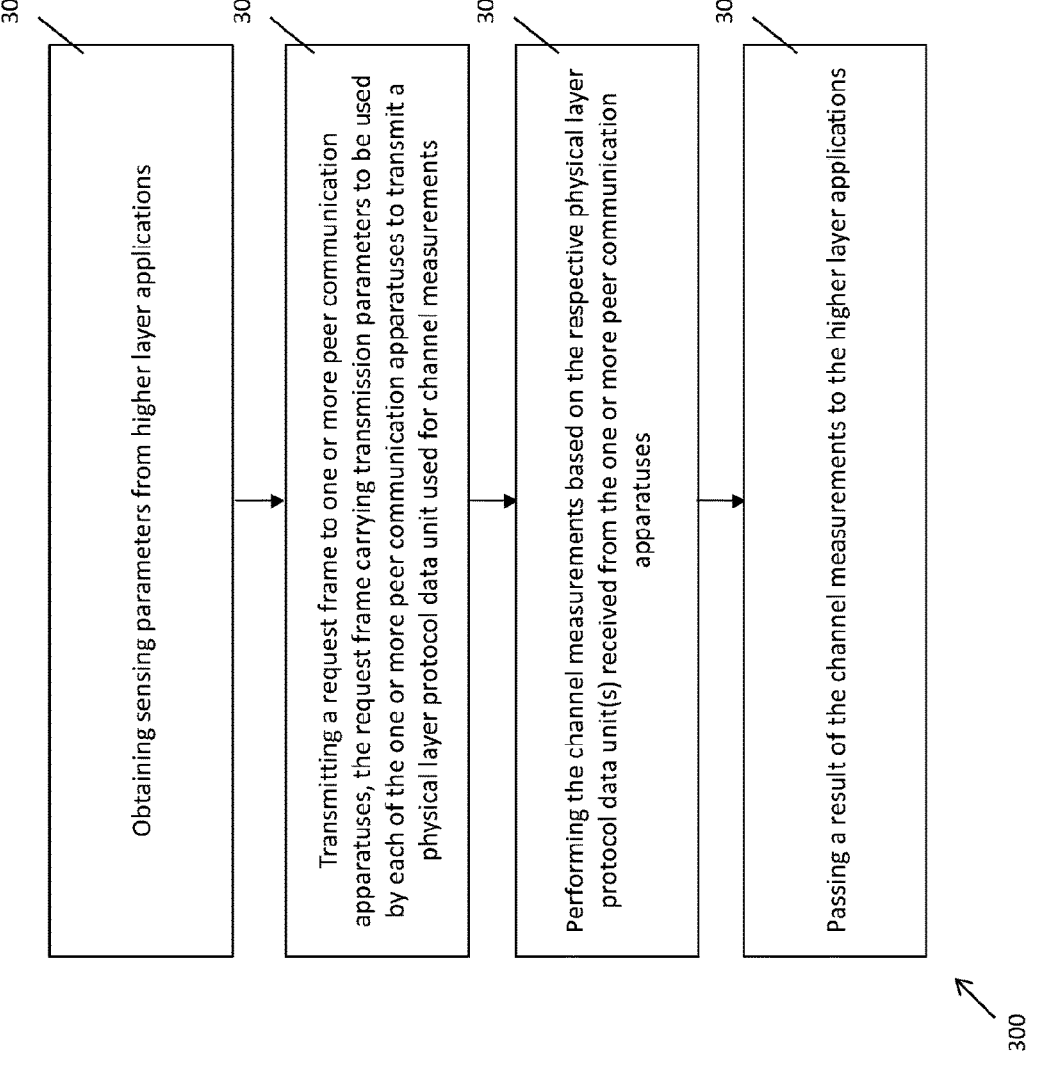

302 — Obtaining sensing parameters from higher layer applications

304 — Transmitting a request frame to one or more peer communication apparatuses, the request frame carrying transmission parameters to be used by each of the one or more peer communication apparatuses to transmit a physical layer protocol data unit used for channel measurements 306 — Performing the channel measurements based on the respective physical layer protocol data unit(s) received from the one or more peer communication apparatuses 308 — Passing a result of the channel measurements to the higher layer applications

| PPDU Format | Meaning |
|---|---|
| 0 | HT NDP (11n) |
| 1 | VHT NDP (11ac) |
| 2 | HE Sounding NDP (11ax) – 0.8 uS Guard Interval (GI) |
| 3 | HE Sounding NDP (11ax) – 1.6 uS Guard Interval (GI) |
| 4 | HE Ranging NDP with Secure LTFs (11az) |

Fig. 11D

$HELTF_{-122,122} =$ (27-41)

Fig. 11E

$HELTF_{-122,122} =$ (27-42)

Fig. 11F

$HELTF_{-122,122} =$ (27-43)

| Public Action field value | Description |
|---|---|
| 48 | WLAN Sensing Session Request |
| 49 | WLAN Sensing Session Response |

COMMUNICATION APPARATUS AND COMMUNICATION METHOD FOR WIRELESS LOCAL AREA NETWORK SENSING

TECHNICAL FIELD

The present disclosure relates to communication apparatuses and methods for wireless local network (WLAN) sensing, and more particularly to communication apparatuses and methods for WLAN sensing under a mix of various types (amendments) of 802.11 devices.

BACKGROUND

WLAN sensing is the use, by a WLAN sensing capable communication apparatus, of received WLAN signals to detect feature(s) of an intended target(s) in a given environment. In particular, examples of features for WLAN sensing includes range, velocity, angular, motion, present of proximity, gesture, people counting, etc; examples of targets for WLAN sensing includes object, human, animal, etc; and examples of environments includes room, house, car, enterprise, etc. A differentiating factor for WLAN sensing compared to other similar applications is that the target is not required to carry any WLAN or any other radio devices. In other words, WLAN sensing works without the target even being aware of the ongoing sensing/detection.

Currently, the are some example use cases that utilize WLAN sensing such as smart home, gesture recognition, gaming control, presence and proximity detection for home/car, liveness, location tracking in store and audio with user tracking (follow-me sound).

There are two categories of 802.11 devices that are considered: (i) mainstream 802.11 devices that operate on frequencies below 7 GHz, e.g. high throughput (HT), very high throughput (VHT), high efficiency (HE). These usually perform WLAN sensing by performing channel measurement and are suitable for use cases that do not require high resolution sensing; and (ii) Millimetre wave 802.11 devices that operate on frequencies above 60 GHz, e.g. digital multi-gigabit (DMG) and enhanced digital multi-gigabit (EDMG), which are capable of high resolution sensing where a single device may perform sensing in a monostatic fashion (similar to radar).

Regarding mainstream 802.11 devices, WLAN sensing application typically involves performing channel measurements and tracking one or more wireless links over time to classify channel variations into events or activities. Since Channel State Information (CSI) provides information that describes how wireless signals propagate in the channel with the various effects such as time delay, amplitude attenuation and phase shift on each subcarrier, CSI is a popular channel measurement parameter for WLAN sensing. However, existing WLAN devices do not provide standardized interfaces for high layer application to obtain the CSI, or to configure the parameters used for channel measurement.

In particular, IEEE 802.11 Project Authorization Request (PAR) states that the new Task Group (TG) formed for WLAN Sensing, 802.11bf, will be a media access control (MAC) amendments, i.e. no changes to the physical layer, for sub-7 GHz frequencies. Legacy 802.11 devices may support 802.11bf features using existing hardware by performing a firmware/software update. In other words, when 802.11bf specification is released, it is likely that 802.11n, 802.11ac, 802.11ax, 802.11az and 802.11be devices will be in use in the market.

It is prominent to explore issues when 11bf is implemented on different 802.11 amendments, and whether WLAN sensing can be performed even with 802.11 devices that do not implement 11bf. Thus, there is a need for communication apparatuses and methods that provide feasible technical solutions for WLAN sensing in the context of a mix of various types (amendments) of 802.11 devices. Furthermore, other desirable features and characteristics will become apparent from the subsequent detailed description and the appended claims, taken in conjunction with the accompanying drawings and this background of the disclosure.

SUMMARY

Non-limiting and exemplary embodiments facilitate providing communication apparatuses and communication methods for wireless local area network (WLAN) sensing across different 802.11 devices.

In a first embodiment, the present disclosure provides a communication apparatus comprising: a transmitter, which, in operation, transmits a request frame to one or more peer communication apparatuses, the request frame carrying transmission parameters to be used by each of the one or more peer communication apparatuses to transmit a physical layer protocol data unit (PPDU) used for channel measurements; a sensing module configured to perform the channel measurements based on the respective PPDU(s) received from the one or more peer communication apparatuses; and an interface configured to obtain sensing parameters from higher layer applications and pass a result of the channel measurements to the higher layer applications.

In a second embodiment, the present disclosure provides a peer communication comprising: a receiver, which, in operation, receives a request frame comprising transmission parameters from a communication apparatus; and a transmitter, which, in operation, transmits a physical layer protocol data unit (PPDU) to be used for channel measurements, the PPDU applying the transmission parameters.

In a third embodiment, the present disclosure provides a peer communication comprising: a transmitter, which, in operation, transmits an unsolicited sounding PPDU in a periodic basis used for channel measurements.

In a fourth embodiment, the present disclosure provides a communication method comprising: obtaining sensing parameter from higher layer applications; transmitting a request frame to one or more peer communication apparatuses, the request frame carrying transmission parameters to be used by each of the one or more peer communication apparatuses to transmit a physical layer protocol data unit (PPDU) used for channel measurements; performing the channel measurements based on the respective PPDU(s) received from the one or more peer communication apparatuses; and passing a result of the channel measurements to the higher layer applications.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which:

FIG. 3 shows a flow diagram illustrating a communication method according to the present disclosure.

FIGS. 11B-F depict example non-legacy long training fields (LTFs).

Figure 1:
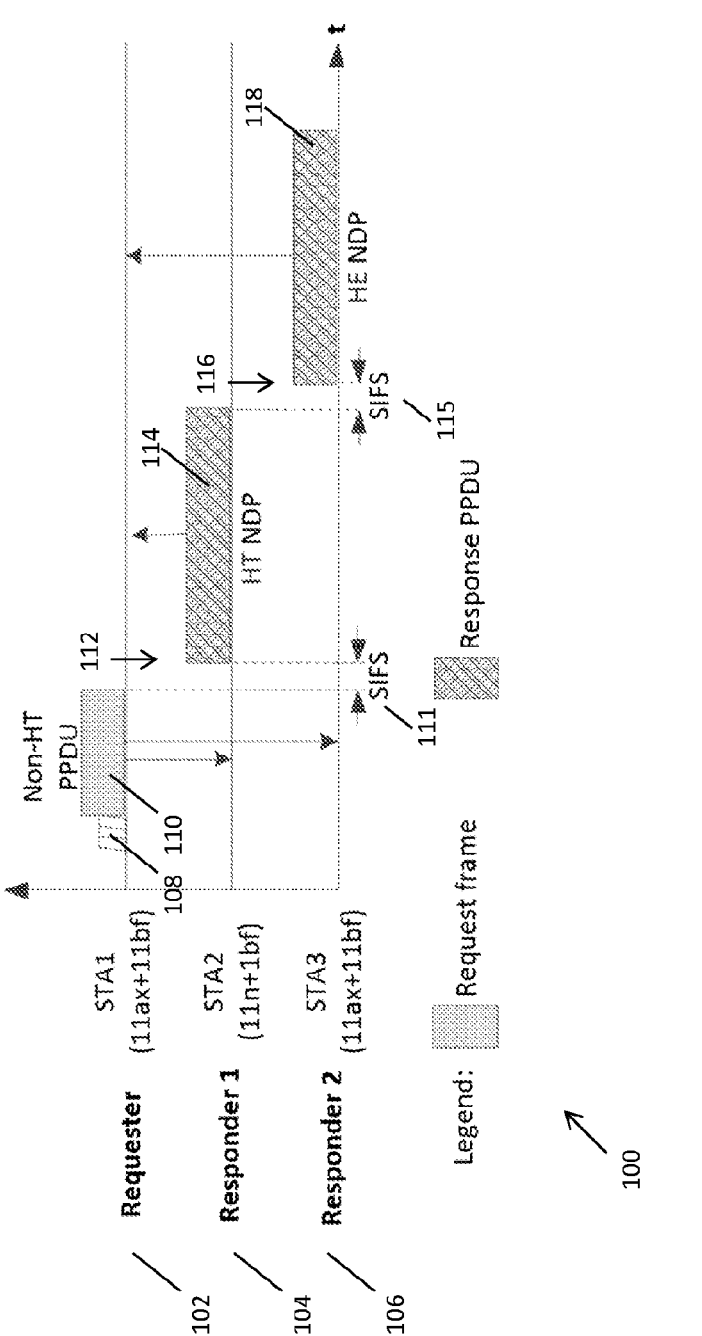
FIG. 1 depicts a flow diagram illustrating a conventional WLAN sensing procedure among a sensing requester (initiator) and two sensing responders with different sounding capabilities.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help an accurate understanding of the present embodiments.

DETAILED DESCRIPTION

Some embodiments of the present disclosure will be described, by way of example only, with reference to the drawings. Like reference numerals and characters in the drawings refer to like elements or equivalents.

In the following paragraphs, certain exemplifying embodiments are explained with reference to an access point (AP) and a station (STA) for wireless local area network (WLAN).

In the context of IEEE 802.11 (Wi-Fi) technologies, a station, which is interchangeably referred to as a STA, is a communication apparatus that has the capability to use the 802.11 protocol. Based on the IEEE 802.11-2016 definition, a STA can be any device that contains an IEEE 802.11-conformant media access control (MAC) and physical layer (PHY) interface to the wireless medium (WM).

For example, a STA may be a laptop, a desktop personal computer (PC), a personal digital assistant (PDA), an access point or a Wi-Fi phone in a wireless local area network (WLAN) environment. The STA may be fixed or mobile. In the WLAN environment, the terms "STA", "wireless client", "user", "user device", and "node" are often used interchangeably.

Likewise, an AP, which may be interchangeably referred to as a wireless access point (WAP) in the context of IEEE 802.11 (Wi-Fi) technologies, is a communication apparatus that allows STAs in a WLAN to connect to a wired network.

The AP usually connects to a router (via a wired network) as a standalone device, but it can also be integrated with or employed in the router.

As mentioned above, a STA in a WLAN may work as an AP at a different occasion, and vice versa. This is because communication apparatuses in the context of IEEE 802.11 (Wi-Fi) technologies may include both STA hardware components and AP hardware components. In this manner, the communication apparatuses may switch between a STA mode and an AP mode, based on actual WLAN conditions and/or requirements. In various embodiments below, the term "STA" is used to refer to as a communication apparatus which can be implemented as a sensing initiator (requester), a sensing responder, a sensing transmitter and/or a sensing receiver.

In WLAN sensing, a sensing initiator can be a STA (or an AP) transmitting a null data packet (NDP) request frame soliciting a NDP from another STA (or another AP) for channel measurements; whereas a sensing responder can be another STA (or another AP) receiving the NDP request frame and transmitting the NDP to the sensing initiator. The sensing initiator then perform the channel measurements based on the NDP frame and the channel measurement results (e.g. Channel State Information) are used for WLAN sensing. In various embodiments below, WLAN sensing is performed without a STA transmitting a NDP request frame soliciting a NDP from another STA for channel measurements. Instead, the STA transmits a NDP to another STA, while the other STA, which receives the NDP, performs the channel measurement based on the NDP.

In various embodiments below, the term "null data packet" or "NDP" may be used interchangeably with the term "sounding physical layer protocol data unit (PPDU)" or "response PPDU". The term "spatial stream" may be used interchangeable with the term "space time stream". The terms "802.11n", "802.11ac", "802.11ax", "802.11az", "802.11be" and "802.11bf" may be used as "11n", "11ac", "11ax", "11az" and "11be" and "11bf" respectively.

FIG. 1 depicts a flow diagram illustrating a conventional WLAN sensing procedure 100 among a STA as a sensing requester (STA1) 102 and two other STAs as sensing responders (STA2, STA3) 104, 106 with different sounding capabilities. Each responder decides its transmission parameters of sounding PPDU based on its own consideration, e.g. based on own and/or requester's capabilities, current transmit configuration, etc. Contention-based channel access procedure, e.g. Enhanced Distributed Channel Access (EDCA) procedure, is illustrated by block 108, and Short Interframe Spacing (SIFS) 111, 115 are illustrated. The sensing requester 102 transmits a non-high-throughput (non-HT) physical layer protocol data unit (PPDU) carrying a request frame to request for respective null data packets (NDPs) from sensing responders 104, 106. The request frame carries the identifiers (e.g. Association Identifier (AID) or MAC Addresses) of sensing responders 104 and 106, the order of the identifiers determining the order in which the sensing responders transmit the NDP. After the last symbol of the non-HT PPDU is transmitted, a SIFS 111 takes effect, and at 112, STA2 104 transmits a HT NDP 114 through two spatial streams based on the capabilities of STA1 102, in this case 11ax+11bf, and its own sounding capabilities (e.g. STA2 104 only supports two spatial streams and is only able to transmit HT NDP), in this case 11n+11bf. After the last symbol of the HT NDP 114 is transmitted, a SIFS 115 takes effect, and at 116, STA3 106 transmits a HE NDP based on the sounding capabilities of STA1 102 and of its own, in this case 11ax+11bf (e.g. both STA1 102 and STA2 106 support four spatial streams and both are 11ax devices and hence are able to transmit/receive HE NDP).

However, this conventional WLAN sensing procedure may lead to inconsistencies in the channel measurements leading to errors in WLAN sensing. For example, WLAN sensing may have been machine learning trained using HT NDPs, but HE NDPs (e.g. received from STA 106) may give a very different channel measurements during actual deployment.

In order to solve such issues of different device capabilities, 11bf specification may specify that the transmission parameters for the sounding PPDUs are based on the values that are receivable by all devices that are participating in the measurements. Hence, the NDP format of all participating devices is limited to HT PPDU even if just one participating device is a HT device, or the number of spatial streams used for NDP transmission is limited to the minimum number of spatial streams among all participating devices, etc. However, such restrictions will limit the potential of WLAN sensing.

Figure 2:
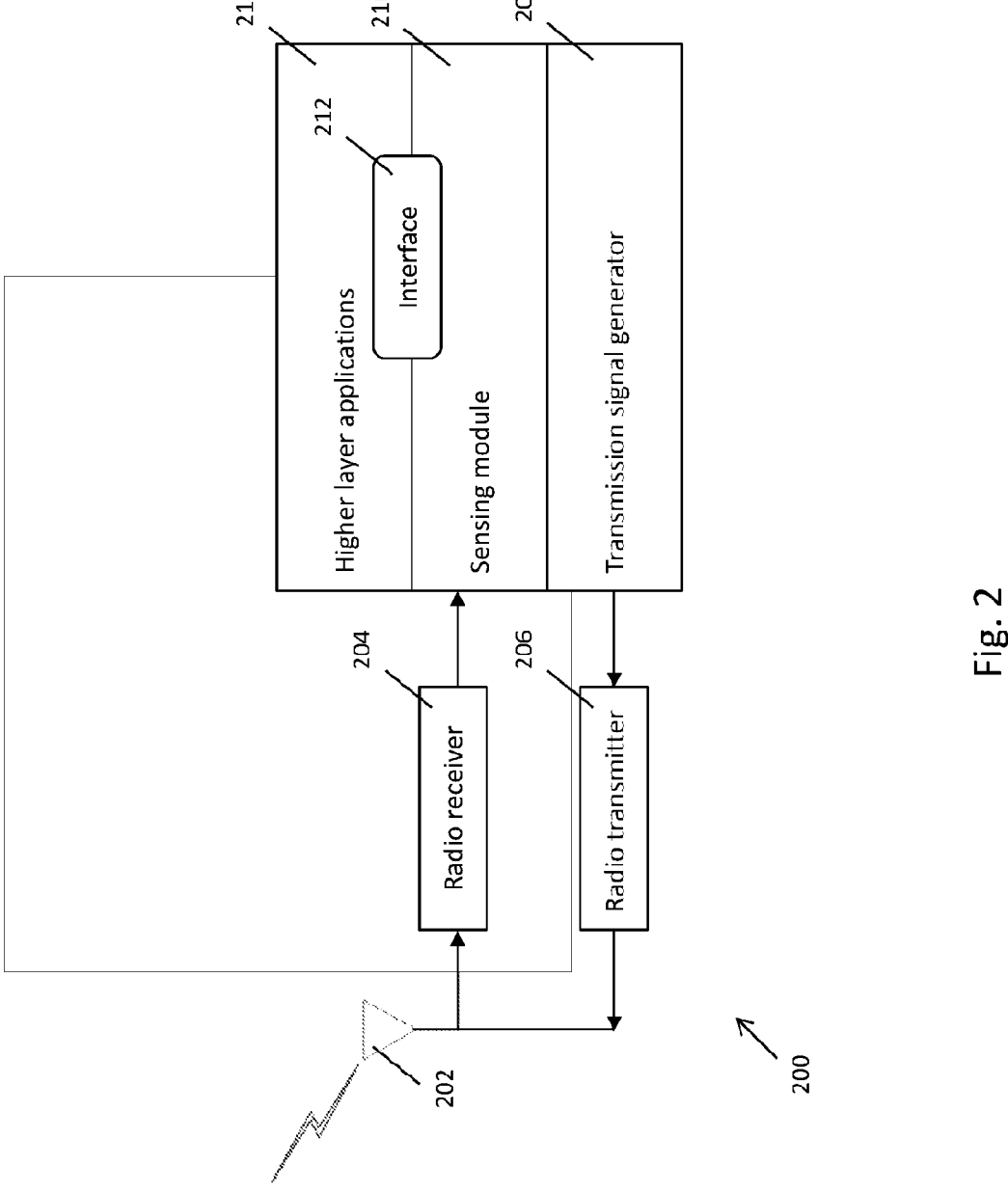
FIG. 2 shows an example configuration of a communication apparatus in accordance with various embodiments. The communication apparatus may be implemented as a sensing requester (initiator) or a sensing responder and configured for channel sounding in accordance with the present disclosure.

FIG. 2 shows an example configuration of a communication apparatus 200 in accordance with various embodiments. The communication apparatus 200 may be implemented as a sensing requester or a sensing responder and configured for WLAN sensing in accordance with the present disclosure. As shown in FIG. 2, the communication apparatus may include at least one radio transmitters 204, at least one radio receiver 206 and at least one antenna 202 (for the sake of simplicity, only one antenna is depicted in FIG. 2 for illustration purposes). The at least one transmission signal generator 208 may generate a request frame to one or more peer communication apparatuses (other STAs), the request frame carrying transmission parameters to be used by each of the one or more peer communication apparatuses to transmit a PPDU used for channel measurements. The at least one radio transmitter 206 transmits the generated request frame to the one or more peer communication apparatuses.

The at least one radio receiver 204 may receive a PPDU from each of the one or more peer communication apparatuses. The communication apparatus 200 may further comprises a sensing module 210 configured to perform channel measurements based on the respective PPDU(s) received from the one or more peer communication apparatuses; and an interface 212 configured to obtain sensing parameters from high layer applications 214 and pass a result of the channel measurements to the higher layer applications 214. The sensing module 210 also communicates with the transmission signal generator to pass the sensing parameters obtained from higher layer applications (e.g. to decide the transmission parameters to include in the NDP request frame).

FIG. 3 shows a flow diagram illustrating a communication method 300 according to the present disclosure. In step 302, a step of obtaining sensing parameters from higher layer applications is carried out. In step 304, a step of transmitting a request frame to one or more peer communication apparatuses is carried out. The request frame carries transmission parameters to be used by each of the one or more peer communication apparatuses to transmit a PPDU used for channel measurements. In step 306, a step of performing the channel measurements based on the respective PPDU(s) received from the one or more peer communication apparatuses. In step 308, a step of passing a result of the channel measurements to the higher layer applications.

According to the present disclosure, two modes of channel measurements for WLAN sensing are proposed: (i) solicited channel measurements, where a 11bf capable STA requests another STA to transmit sounding PPDUs. The requester specifies the transmission parameters of the sounding PPDUs such as format of PPDU (HT NDP, VHT NDP or HE NDP, etc) and requester's transmit power and target received signal strength indicator (RSSI), bandwidth, number of space time streams, etc; and (ii) unsolicited channel measurements, where a 11bf capable STA periodically transmits unsolicited sounding PPDUs. The solicited/unsolicited sounding PPDUs are used by 11bf STA(s)/device(s) to perform channel measurements which in turn are used for WLAN sensing.

In various embodiments, a 11bf capable device that requests another device to sound the channel may be called WLAN Sensing Requester/Initiator. A 11bf capable device that responds to another device's sensing request to sound the channel may be called WLAN Sensing Responder. A WLAN Sensing transmitter is a device that transmits the sounding PPDU (solicited or unsolicited). For solicited case, it may be same as WLAN Sensing Responder. A device that performs channel measurements based on the received sounding PPDUs is a WLAN Sensing receiver. For solicited case, this may be same as WLAN Sensing Requester/Initiator.

According to an embodiment, a 11bf device advertises its WLAN sensing capabilities, for example, in extended capabilities elements such as a capability bit in a frame according to Table 4. In particular, a capability bit may indicate that the 11bf device is: (i) a sensing requester, i.e. a device capable of requesting another device to transmit sounding PPDUs and providing channel measurement results to higher layer application; (ii) a sensing responder, i.e. a device capable of acting as a WLAN Sensing Responder and can transmit sounding PPDU(s) (e.g. NDP) upon request; (iii) SENS channel measurement, i.e. a device capable of performing channel measurements for WLAN sensing and providing the results to upper layers; and (iv) unsolicited sounding, i.e. a device capable of providing periodic transmissions of sounding frame in unsolicited manner.

TABLE 1

Various WLAN sensing capabilities indicated by a capability bit in a beacon frame, a probe response frame, FILS discovery frame, a probe request frame, an association request frame or other unicast frame.

| Capability bit | Meaning |
|---|---|
| Sensing Requester | Device is capable of requesting another device to transmit sounding PPDUs and providing the channel measurement results to higher layer applications. |
| Sensing Responder | Device is capable of acting as a WLAN Sensing Responder and can transmit sounding PPDUs (e.g. NDP) upon request. |
| SENS Channel measurements | Device is capable of performing channel measurements for WLAN Sensing and providing the results to upper layers. |
| Unsolicited Sounding | Device is capable of providing periodic transmissions of sounding frames in unsolicited manner. |

Figure 4:
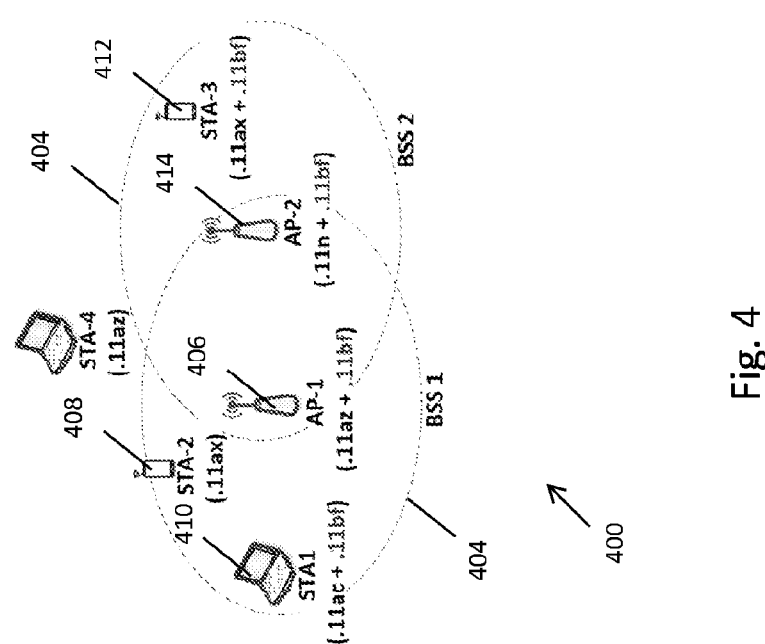
FIG. 4 depicts a network architecture with two basic service sets (BSSs). According to an embodiment.

FIG. 4 depicts a network architecture 400 with two basic service sets (BSSs) 402, 404 according to an embodiment. The first BSS (BSS1) 402 comprises an AP (AP-1) 406 and two STAs (STA1, STA-2) 408, 410, where the AP1 406 and the STA-2 410 are 11bf capable devices, and the STA1 408 is not. The second BSS (BSS2) 404 comprises an AP (AP-2) 414 and a STA (STA-3) 412, where both the AP-2 414 and the STA-3 412 are 11bf capable devices. In an embodiment, the capability bit relating to the sensing capabilities of a 11bf device may be carried in a beacon frame, a probe response frame, a fast initial link setup (FILS) discovery frame, etc, transmitted by an AP like 406, 414. In another embodiment, the capability bit relating to the sensing capabilities of a 11bf device may be carried in a probe request frame, associated request frames transmitted by a non-AP STA like 408, 410, 412. Yet in another embodiment, the capability bit relating to the sensing capabilities of a 11bf device may be exchanged in other unicast frame exchanges.

Figure 5:
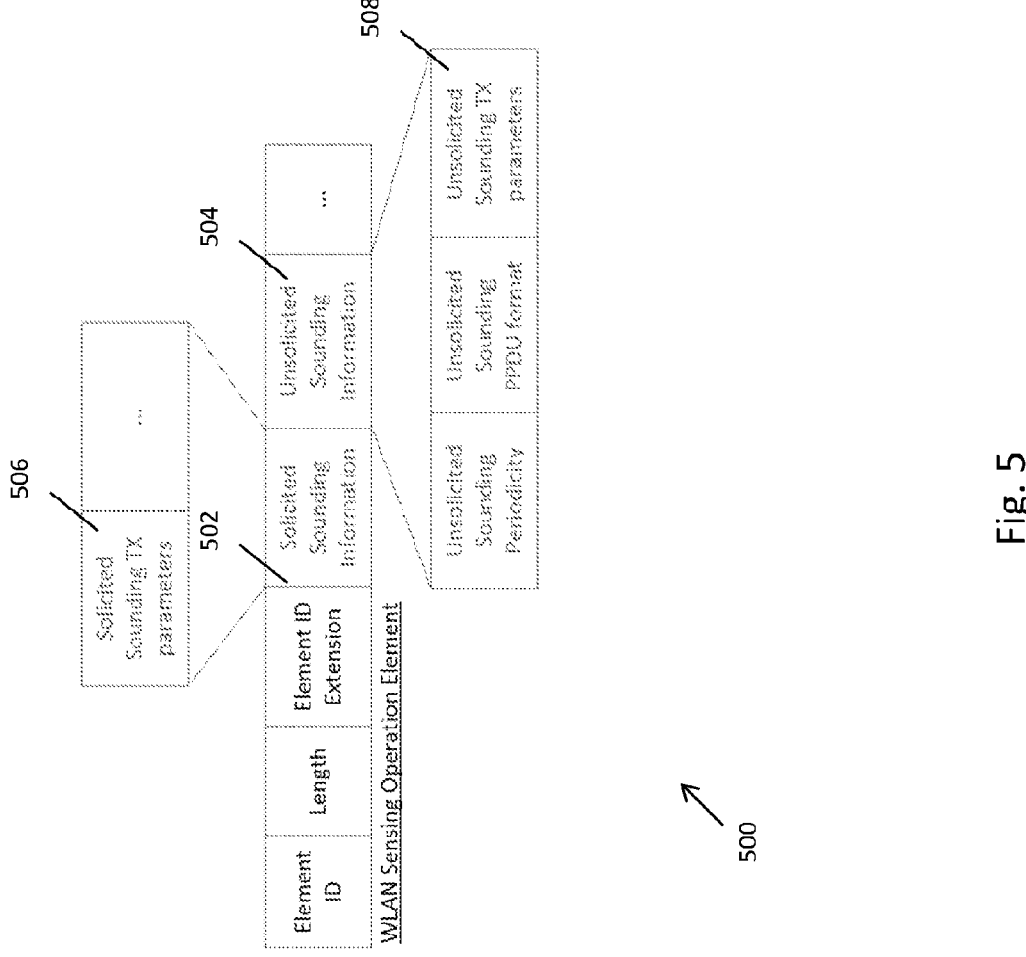
FIG. 5 depicts an example format of a WLAN sensing operation element.

According to various embodiments, a 11bf capable AP advertises its WLAN sensing operation parameters, for example, in a WLAN sensing operation element. FIG. 5 depicts an example format of a WLAN sensing operation element 500. The WLAN sensing operation element 500 may comprise an Element Identifier (ID) field, a Length filed, an Element ID Extension field, a Solicited Sounding Information field 502, an Unsolicited Sounding Information field 504. The Solicited Sounding Information field 502 comprises subfields relating to solicited sounding transmission (TX) parameters such as maximum values supported for Response PPDUs: channel bandwidth, number of spatial streams and transmission power, etc, used for solicited sounding PPDUs; whereas the Unsolicited Sounding Information field comprises subfields relating to unsolicited sounding periodicity: unsolicited sounding PPDU format and unsolicited sounding TX parameters such as channel bandwidth, number of streams, TX power, etc used for unsolicited sounding PPDUs.

Figure 6:
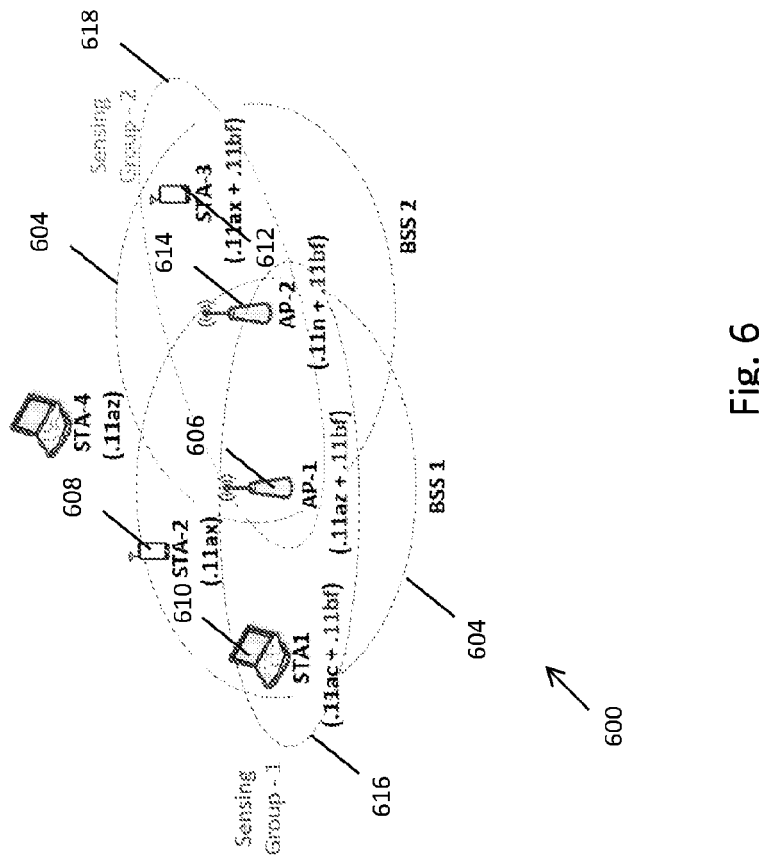
FIG. 6 depicts a network architecture with two basic service sets and two sensing groups according to an embodiment.

According to the present disclosure, before starting an actual WLAN sensing, an initial setup may be carried out, and two or more sensing capable devices may form group (hereinafter referred to as "sensing group"). In the simplest case, a sensing group may comprise only two devices. A sensing group may be formed by two devices across different BSSs. FIG. 6 depicts a network architecture 600 with two basic service sets and two sensing groups according to an embodiment. Similar to the network architecture of FIG. 4, the first BSS (BSS1) 602 comprises an AP (AP-1) 606 and two STAs (STA1, STA-2) 608, 610, where the AP1 606 and the STA1 610 are 11bf capable devices, and the STA-2 608 is not. The second BSS (BSS2) 604 comprises an AP (AP-2) 614 and a STA (STA-3) 612, where both the AP-2 614 and the STA-3 612 are 11bf capable devices. In this embodiment, after WLAN sensing group setup, sensing group 1 616 comprising AP-1 606, STA1 618 and AP-2 614 and sensing group 2 618 comprising AP-1 606, AP-2 614 and STA-3 612 are formed. Once a sensing is formed, any of the group member can take any sensing role (request/responder etc) based on own and peer STA's capabilities.

Each sensing group in a network architecture is identified with a Group ID. Each member of the group may also be assigned with a Sounding Group ID (SGID) or Member ID that is unique within the group. The device initiating the group formation, e.g. STA1 702 in FIG. 7, acts as the group leader and is responsible for assigning group ID and member IDs. If all STAs are associated STAs, associated identifier (AID) may be used instead. A device may be a member of multiple sensing groups.

Figure 7:
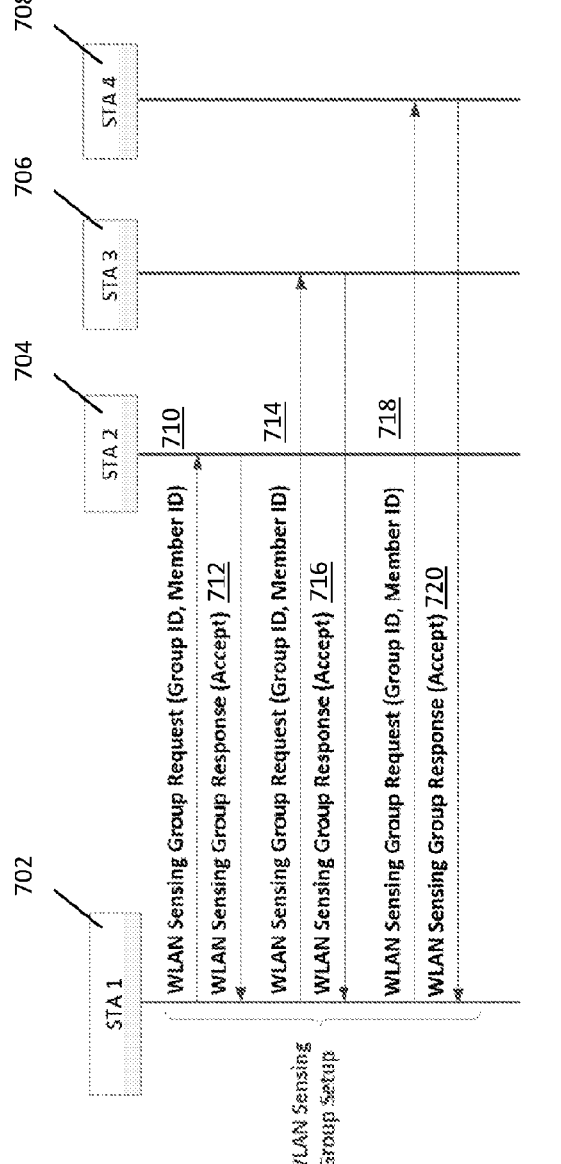
FIG. 7 depicts a flow diagram illustrating communications of a WLAN sensing group setup according to an embodiment.

FIG. 7 depicts a flow diagram 700 illustrating communications of a WLAN sensing group setup according to an embodiment. In this embodiment, STA1 702 initiate a sensing group formation with STA2 704, STA3 706 and STA4 708. In step 710, the WLAN sensing group setup may start when STA1 702 transmits a WLAN Sensing Group Request with a Group ID and a Member ID to STA2 704. The Group ID refers to the ID of the sensing group, while the Member ID refers to the ID assigned to STA2 if it accepts the Group Request. The STA2 704 receives the sensing group request. Subsequently, in step 712, the STA2 704 may accept the sensing group request and transmit a WLAN Sensing Group Response with a status of Accept. Similar steps are carried out consecutively with other STAs such as STA3 706 and STA4 708. In step 714, the STA1 702 transmits a WLAN Sensing Group Request with the Group ID and a Member ID to STA3 706. The STA3 706 receives the sensing group request. Subsequently, in step 716, the STA3 706 may accept the sensing group request and transmit a WLAN Sensing Group Response with a status of Accept. In step 718, the STA1 702 transmits a WLAN Sensing Group Request with the Group ID and a Member ID to STA4 708. The STA4 708 receives the sensing group request. Subsequently, in step 720, the STA4 708 may accept the sensing group request and transmit a WLAN Sensing Group Response with a status of Accept. As such, a sensing group comprising STA1 702, STA2 704, STA3 706 and STA4 708 is formed.

In an embodiment, the Group ID+Member ID may help to identify devices during WLAN sensing even if the MAC addresses of the devices change (e.g. due to MAC Address randomization etc). The devices may also be authenticated when forming the sensing group, for e.g. using pre-set passwords or other authentication tokens. For example, the Requesting device can compute an authentication tag by using a pre-set password as a secret key and running a Hash operation, e.g. Authentication tag=HASH(password, Requester's MAC Address, salt). HASH may be any commonly used Hash function such as HMAC, or SHA-256 etc. Salt can be a numeric value chosen by the requester that is different each time and is included in the WLAN Sensing Group Request frame along with the Authentication tag. The device that receives the request can perform the exact same procedure to compute its own version of the Authentication tag using its own password, Requester's MAC Address, and the provided salt. If the computed Authentication tag is same as the Authentication tag included in the Request frame, the receiver can conclude that the requester also has access to the same password and is hence authorized to initiate the group formation. Similar method can also be used in the reverse direction to authenticate the receiver in the WLAN Sensing Group Response frame.

The sensing group leader may also assign a Member ID for itself and advertise to the group, to it may be a fixed value (e.g. 0) that is known to group members. Alternatively, the sensing group formation may be coordinated by a central entity (AP or a server in the DS), while multiple STAs in the group could initiate the group forming (for the same group ID) with different STAs.

Figure 8:
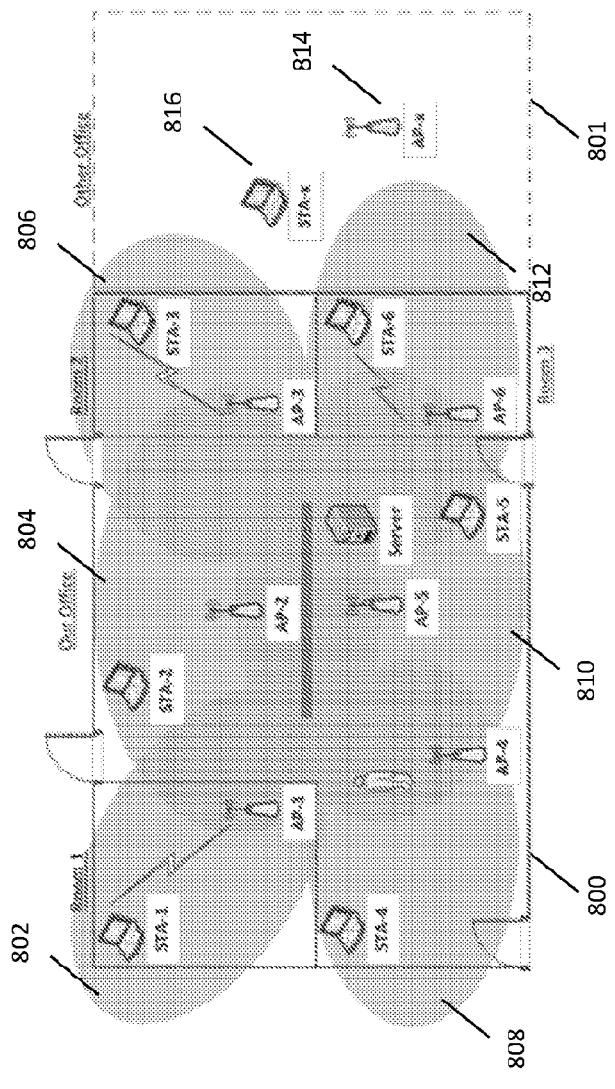
FIG. 8 depicts an example scenario under a network architecture of six basic service sets and one sensing group.

FIG. 8 depicts an example scenario under a network architecture of six BSSs and one sensing group. The area in solid line 800 (as opposed to dashed line 801) represents the deployment location, e.g. an office, and the dashed line 801 represents an area outside the office. In this example scenario, there are six APs and thus six BSSs represented by circles 802, 804, 806, 808, 810, 812. Two WLAN sensing applications may be deployed to: (i) presence detection; and (ii) motion detection. Presence detection is used to detect presence and/or absence of people in the meeting rooms during office hours where coverage area is limited to each room. Motion detection is used to detect human motion within area of interest during out of office hour where the coverage area expands to the entire office area 800.

For the presence detection application running in each meeting room, since the coverage area is limited to each meeting room, it can be assumed that all sensing devices (within the meeting room) are part of the same BSS (e.g. BSS 802 with AP-1 & STA-1 in room 1, BSS 806 with AP-3 & STA-3 in room 2 & BSS 812 with AP-6 & STA-6 in room 3) and hence, formation of sensing group (across different BSSs) may not be necessary. However, for the motion detection application, since the coverage area is large, multiple BSSs may be grouped and formed as part of the same sensing group. In this example, as the coverage area is expanded to cover the whole office, a sensing group comprising all six BSSs 802, 804, 806, 808, 810, 812 may be formed. All the 11bf capable device in the office (within the six BSSs 802, 804, 806, 808, 810, 812) may be part of the Security Sensing Group, while AP-x 814 and STA-x 816, which are outside the office, are not. The above is based on an assumption that all APs are within coverage of at least one central AP (e.g. AP-2 or AP-5), and the group formation process may be relayed by edge APs for the STAs that are out of coverage of the central APs.

In the example, both WLAN Sensing applications may run on a centralized server. Each SENS (sensing) device capable of channel measurements (e.g. all APs) upload the results of channel measurement (e.g. CSI values) to a server, e.g. the server in FIG. 26B, which is processed by each WLAN Sensing application (e.g. using various Machine Learning techniques) to extract relevant outcomes (e.g. presence/absence, human motion etc).

Figure 9:
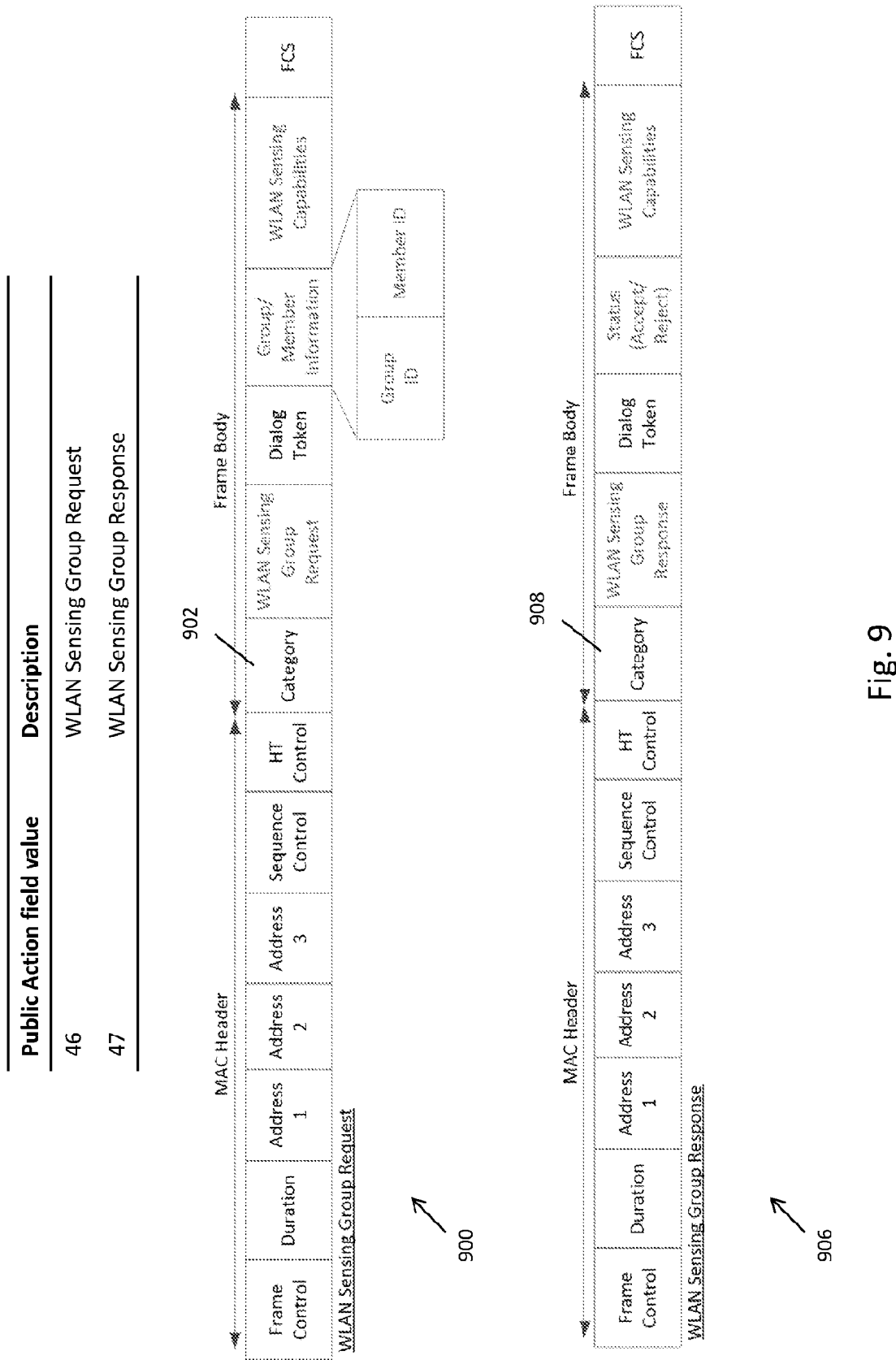
FIG. 9 depicts an example WLAN Sensing Group Request frame 900 and an example WLAN Sensing Group Response frame 906 for WLAN sensing group setup.

Two Public Action frames are defined as the WLAN Sensing Group Request frame and the WLAN Sensing Group Response frame used, e.g. in FIG. 8, for initial setup and formation of a WLAN sensing group. FIG. 9 depicts an example WLAN Sensing Group Request frame 900 and an example WLAN Sensing Group Response frame 906 for WLAN sensing group setup. Public Action frames are Class 1 frames and can be used to communicate with unassociated STAs. The category field 902, 908 are set as 4 (Public Action) for Public Action frames. The Public Action field, which the field following right after the Category fields 902, 908, is used to differentiate the various types of Public Action frames. For example, a Public Action field value of 46 is defined to refer to a WLAN Sensing Group Request and a Public Action field value of 47 is defined to refer to a WLAN Sensing Group Response.

A Public Action frame 900, 906 may comprise a Frame Control field, a Duration field, three Address fields, a Sequence Control field, a HT Control field, a Category field (or Public Action field) 902, 908, a Dialog Token field and a Frame Check Sequence (FCS) field. The Frame Control field, the Duration field, the three Address fields, the Sequence Control field and the HT Control field may be grouped as MAC header while the Category field (or Public Action field) 902, 908 an the Dialog Token field may be grouped under frame body. Depending on the Category field or Public Action field value defining its function for WLAN sensing group formation, additional fields may be included in the frame body of the Public Action frames 900, 906. For instance, where the Category field 902 has a value of 4 (Public Action) and the Public Action field has a value of 46 referring to a WLAN Sensing Group Request, the Public Action frame 900 may function as a WLAN Sensing Group Request frame and further comprise a WLAN Sensing Group Request field, a Group/Member Information field and a WLAN Sensing Capabilities field in the frame body. The Group/Member Information field may comprise a Group ID subfield and a Member ID which are assigned to recipient of the WLAN Sensing Group Request frame 900 if the recipient accepts the Group request. The Request frame may also indicate the nominal periodicity of the channel measurement exchanges, i.e. how often the group members may be expected to participate in channel measurements (e.g. by transmitting 1 Sounding PPDU every 20 microsecond etc). The recipient may refuse the group formation request if it is not able to comply with the request (e.g. because the channel measurement request is too frequent etc).

On the other hand, where the Category field 902 has a value of 4 (Public Action) and the Public Action field has a value is 47 referring to a WLAN Sensing Group Response, the Public Action frame 906 may function as a WLAN Sensing Group Response frame and further comprise a WLAN Sensing Group Response field, a Status (Accept/Reject) field and a WLAN Sensing Capabilities field in the frame body.

In the following paragraphs, various examples relating to a first embodiment of the present disclosure are explained with reference to a sensing requester and a sensing responder for solicited and unsolicited channel measurements which in turn are used for WLAN sensing.

According to a first embodiment, during solicited channel measurements (i.e. Request/Response exchange), the request specifies the transmission parameters of a Response PPDU, such as the format of the Response PPDU (HT NDP, VHT NDP, HE NDP etc), requester's transmit power and target RSSI for the Response PPDU, number of spatial streams in the Response PPDU and bandwidth of the Response PPDU (same or less than the bandwidth of the PPDU carrying the Request frame). The responder then transmits a response PPDU using the requested transmission parameters.

Figure 10:
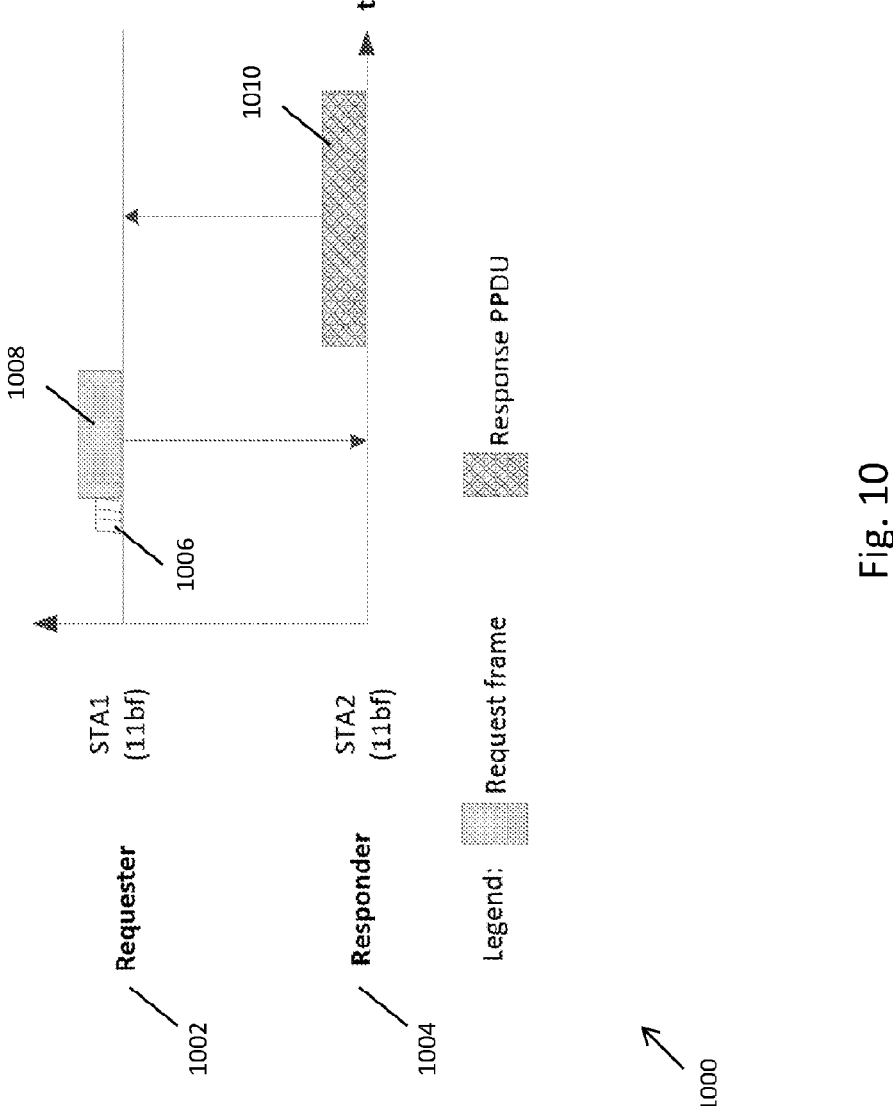
FIG. 10 depicts a flow diagram illustrating communications for solicited channel measurements between two STAs according to a first embodiment of the present disclosure.

FIG. 10 depicts a flow diagram 1000 illustrating communications for solicited channel measurements between a sensing requester 1002 and a sensing responder 1004 according to the first embodiment of the present disclosure. Both the sensing requester 1002 and the sensing responder 1004 are 11bf devices. Contention-based channel access procedure, e.g. EDCA procedure, is illustrated by block 1006. The sensing requester 1002 transmits a Request frame 1008 to the sensing responder 1004, the Request frame 1008 specifying the transmission parameters of a response PPDU that is solicited for channel measurements. After the last symbol of the Request frame 1008 is transmitted, the sensing responder 1004 uses the requested transmission parameters to generate a response PPDU 1010 and transmit the response PPDU 1010 to the sensing requester 1002 after an interval of SIFS. Subsequently, the sensing requestor uses the response PPDU to perform channel measurements.

Figure 11A:
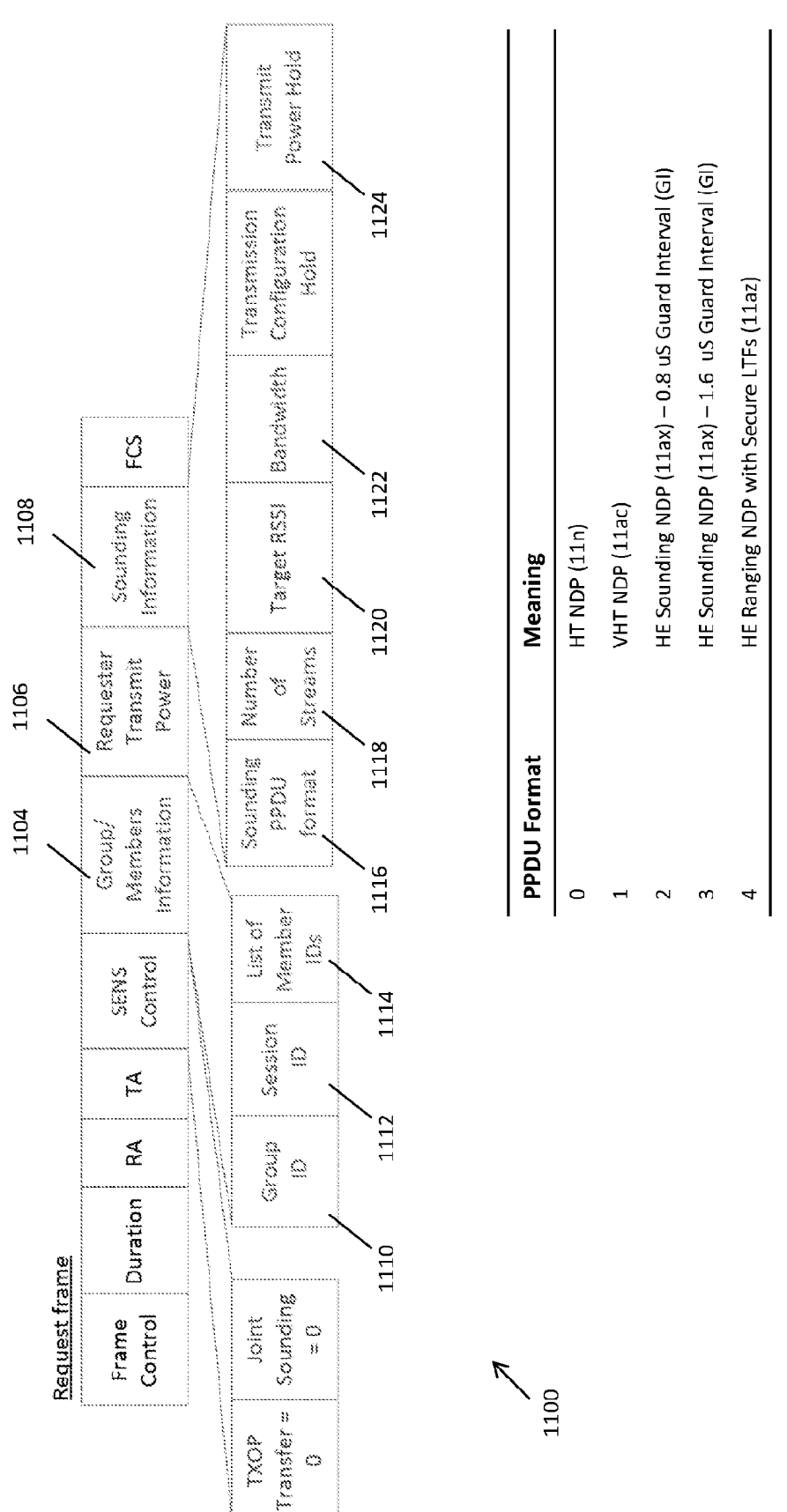
FIG. 11A depicts an example request frame for solicited channel measurements.

A sounding request frame used for soliciting a Response PPDU for solicited channel measurements in FIG. 10 may be a control frame. FIG. 11A depicts an example Request frame 1100 for solicited channel measurements. The Request frame 1100 may comprise a Frame Control field, a Duration field, a Recipient Address (RA) field, a Transmission Address (TA) field, a SENS (sensing) Control field, a Group/Members Information field 1104, a Requester Transmit Power field 1106, a Sounding Information field 1108 and a FCS field. The SENS Control field may further comprise a Transmission Opportunity (TXOP) Transfer subfield which is set to "0" and a Joint Sounding subfield which is also set to "0" to indicate a sequential sounding. The Group/Members Information field may further comprise a Group ID subfield 1110 to indicate WLAN Sensing Group, a Session ID subfield 1112 to indicate WLAN Sensing Session and List of Member IDs subfield 1114 to indicate one or more STAs from which a response is solicited. When more than one Member ID is included, the Response PPDUs are transmitted sequentially with a gap of SIFS between each of the Response PPDUs, with the STAs transmitting in the order in which their IDs appear in the list.

The Requester Transmit Power field 1106 indicates the transmit power used for the request frame. In particular, the Requester Transmit Power subfield 1106 indicates the Transmit Power (TX_Power) used for the Request frame; the Target RSSI field indicates the expected receive power (Target_RSSI) at the Requester in the non-legacy LTFs of the Response PPDU. If RX_RSSI is the receive power at which the request frame was received (by the Responder), the Responder can use the TX_Power to calculate the path loss: PL=TX_Power–RX_RSSI. The Responder can then calculate the Transmit Power as Target_RSSI+PL. This helps to ensure that the Receive power of Sounding PPDUs in different instances of channel measurements remain same or close so as to minimize the variations in the channel measurement (specially the CSI amplitude).

Figure 11B:
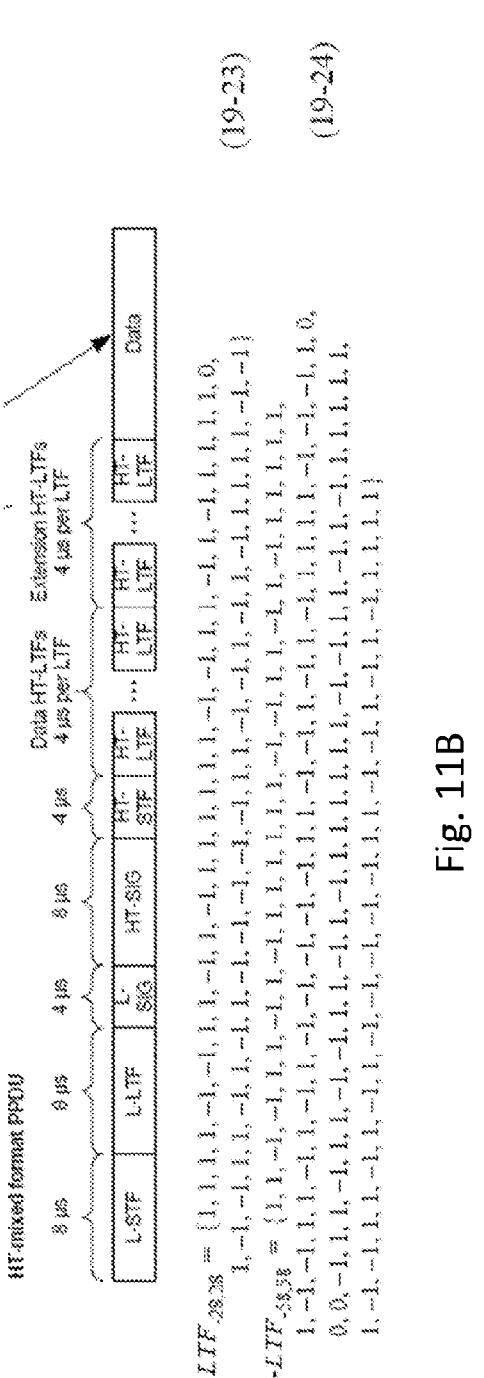
Figure 11C:
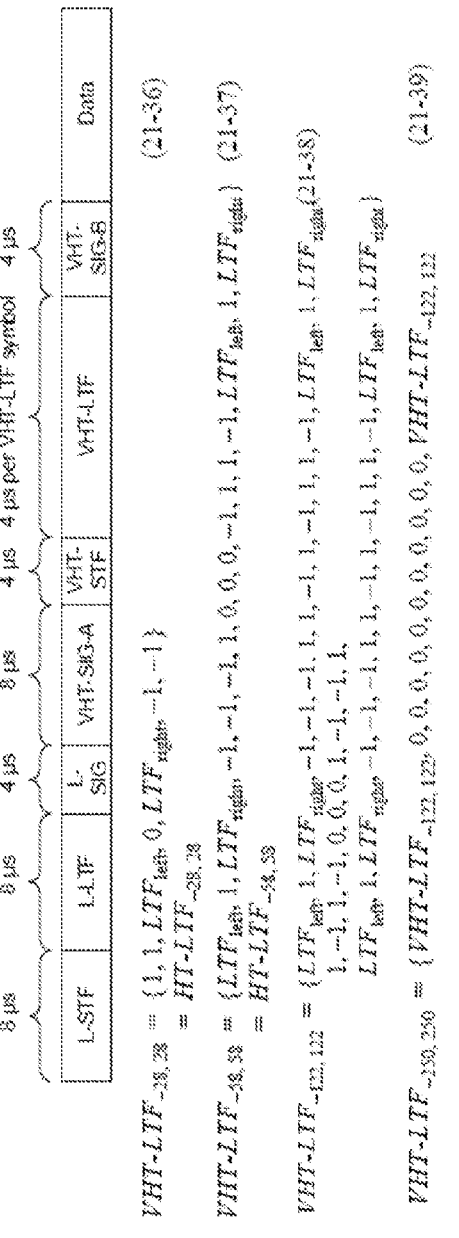
Figures 11D, 11E, 11F:
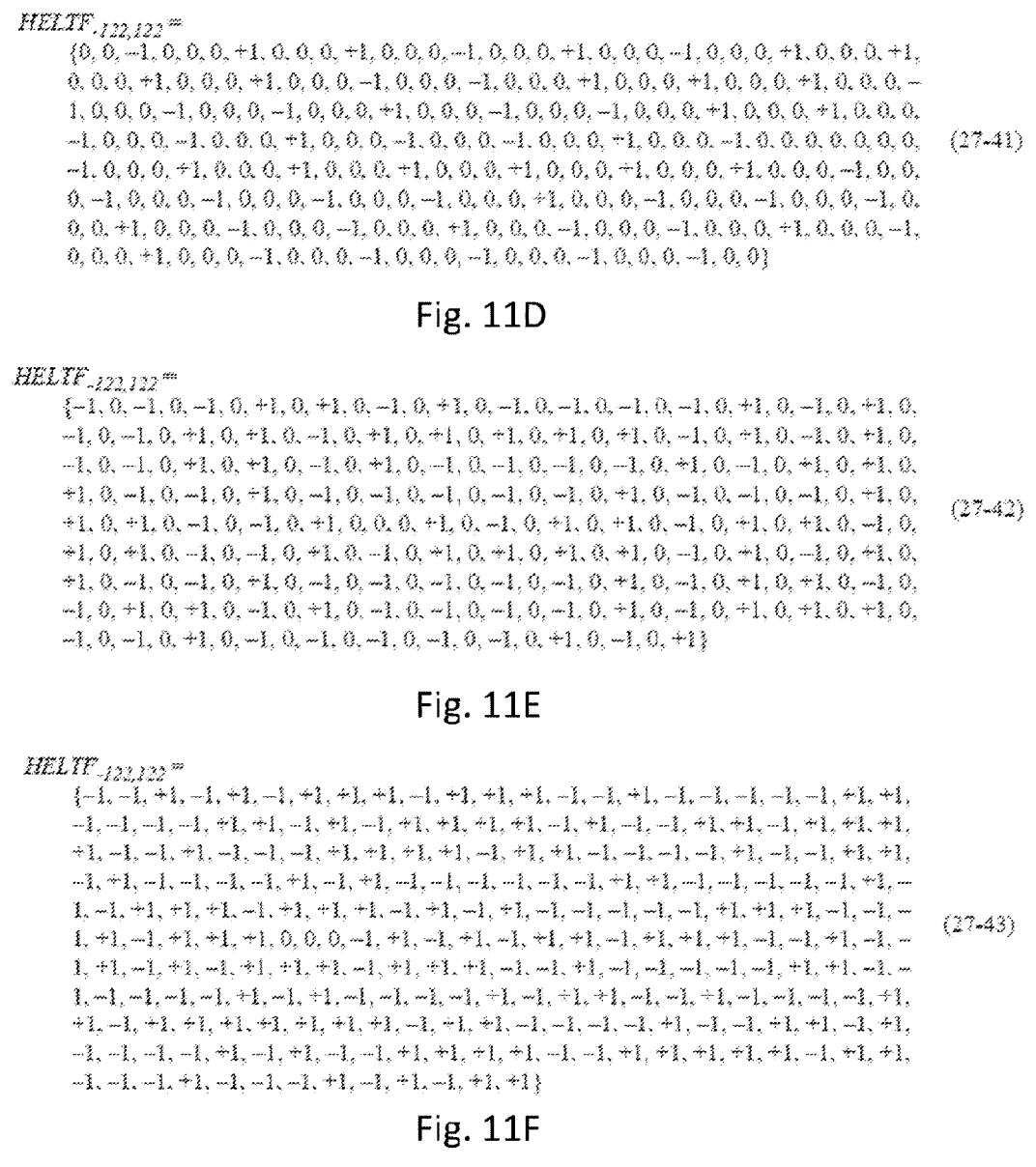

The Sounding Information field 1108 indicates transmission parameters for the Response PPDU and may comprise a Sounding PPDU Format subfield 1116, a Number of Stream subfield 1118, a Target RSSI subfield 1120, a Bandwidth subfield 1122, a Transmission Configuration Hold subfield and a Transmit Power Hold subfield 1124. The respective PPDU formats represented by the values of Sounding PPDU Format subfield 1116 are depicted in the table of FIG. 11. The Number of Stream subfield 1118 indicates the number of space time streams to be used in the response PPDU. The Target RSSI subfield 1120 indicates the expected receive power at the Requester in the non-legacy long training fields (LTFs) of the Response PPDU. Examples of the non-legacy LTFs of HT-LTFs, VHT-LTF, 1× HE-LTFs with 64 subcarriers, 2× HE-LTFs with 128 subcarriers and 4× HE-LTFs with 256 subcarriers are illustrated in FIGS. 11B-F respectively. For HE Sounding PPDUs, 2× HE-LTF with either 8 μS or 1.6 μS GI is mandatory; whereas 4× HE-LTF with 3.2 uS GI is optional. The subcarrier spacings of HT-LTFs and VHT-LTFs are 312.5 kHz, 312.5 kHz and 78.125 kHz respectively.

The Transmit Power Hold subfield 1124 indicates that transmit power of a Response PPDU should not change during a sensing session while the "Transmission configuration hold" request responder not to make changes in other transmit settings of the sensing responder, such as number of transmit antennas and/or antenna used, and beamforming update etc., when transmitting the Response PPDU.

Figures 12A, 12B:
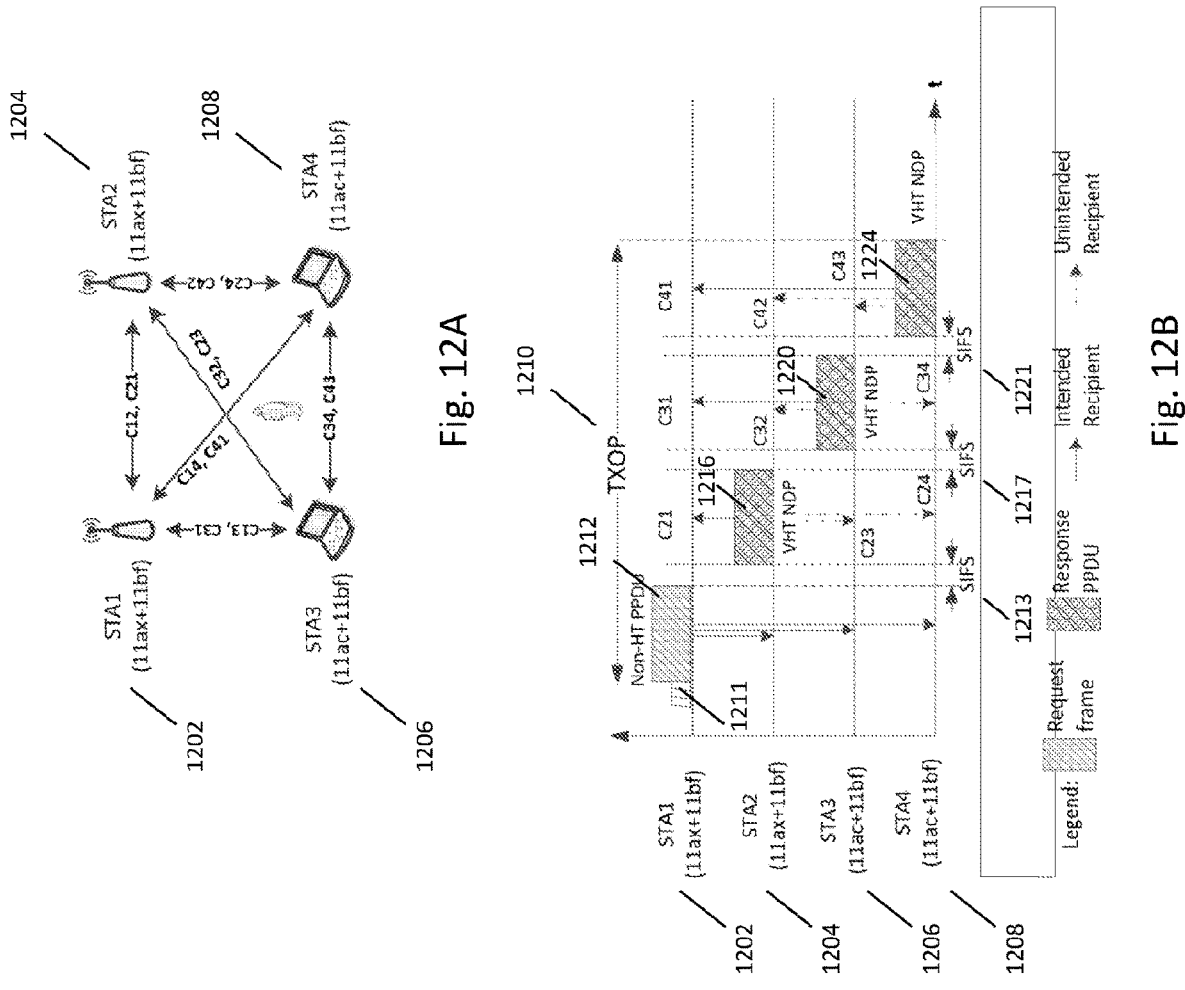
FIGS. 12A-B depict flow diagrams illustrating communications for solicited channel measurements according to the first embodiment.

FIGS. 12A-B depict flow diagrams illustrating communications for solicited channel measurements in a Transmission Opportunity (TXOP) 1210 according to the first embodiment. According to an example of the first embodiment, a HE STA solicits VHT NDPs from one HE and two VHT sensing responders. The communications among the HE STA or sensing requester (STA1) 1202, the HE sensing responder (STA2) 1204 and the two VHT sensing responders (STA3, STA4) 1206, 1208 can be illustrated in FIG. 12A. The sensing group members, i.e. STA1-4, can communicate with each other, thus resulting in a total number of six channels to be measured as illustrated by six two-way arrows in FIG. 12A correspondingly.

The Sounding Request frame 1211 may be carried in a non-HT PPDU 1212 for better protection. The Sounding Request frame 1211 may include IDs of STA2, STA3, STA4 and indicates Response PPDU format as VHT. As such, as illustrated in FIG. 12B, after the last symbol of the non-HT PPDU 1212 is transmitted, a SIFS 1213 may take effect, and the three sensing responders STA2-4 1204, 1206, 1208 transmit respective VHT NDPs 1216, 1220, 1224 sequentially with a gap of SIFS, 1217, 1221 between the VHT NDPs, as illustrated by three arrows C21, C31, C41, respectively. Subsequently, STA1 receive the VHT NDPs and measure channels C21, C31 and C41.

Further, in this example, even though the sensing channel measurement is initiated by STA1, if a responder is also capable of performing channel measurements for WLAN sensing, the non-transmitting responder may also make use of the (unintended) sounding PPDU, in this case VHT NDP, to perform channel measurements. The Requester STA1, 1202 may also choose the transmission parameters of the Response PPDU such that all STAs are able to receive the Response PPDU and perform channel measurements.

STAs can identify the transmitters of the unintended sounding PPDUs (and thereby the channels) based on the information carried in the Request frame (Group ID, list of members IDs). During the formation of the sensing group, STA may record the mapping of Members ID and MAC Addresses of the other STAs in the group, and the transmitter of the unsolicited PPDUs can be identified based on the position of the Member IDs in the Request frame. The STAs that measure channels bases on the unintended (or unsolicited) sounding PPDUs can use the Member ID to MAC Address mapping when reporting the result of the channel measurements (identified by MAC Address) to higher layer applications, since higher layers may not be aware of the member IDs assigned to a STA.

For instance, returning to FIG. 12B, STA2 1204 may be an unintended recipient of VHT NDPs 1220 & 1224 transmitted as illustrated by arrows C32 and C42 and able to identify the transmitters of the VHT NDPs, i.e. STA3 1206 and STA4 1208, respectively based on the information carried in the Request frame 1212. In this way, STA2 1204 can measure channels C32 and C42 if STA2 1204 is capable of performing channel measurements.

According to the present disclosure, regarding unsolicited channel measurements, a 11bf capable STA may also provide unsolicited sounding as a service. For example, if there are multiple sensing initiators requesting the 11bf capable STA to respond with sounding frames in a periodic manner, the STA may choose to transmit unsolicited sounding PPDUs in a period manner (e.g. once every 20 TUs).

The transmitting STA (e.g. an AP) advertises its unsolicited sounding capabilities, the transmission periodicity etc. in Beacon frame or a Probe Response frame. Sensing devices interested in measuring the channel from the transmitting STA can subscribe for the service with the STA, for example, by performing management frame exchange. Alternative, they may also perform channel measurement passively, without the transmitting STA being aware of the existence of the sensing devices. Such devices may be called WLAN Sensing Passive Receivers. In various embodiments below, for unsolicited Channel Measurements, the device initiating the transmissions of Sounding PPDUs may be called WLAN Sensing Transmitters, while the devices receiving the Sounding PPDUs for the purpose of channel measurements may be called WLAN Sensing Receivers.

The sounding PPDUs for unsolicited channel measurements should be in a format understood by all devices that have subscribed for such as service (e.g. as 11n NDP). If a NDP is used as unsolicited sounding frame, in order to identify the transmitter of the NDP, a CTS-to-self frame or a broadcast HT/VHT/HE NDP Announcement frame not addressed to any associated STA is transmitted a SIFS prior to the NDP.

If the transmitting STA is already transmitting other frame at a regular periodicity (e.g. an HE AP transmitting FILS Discovery frames every 20 μS in the 6 GHz band, or a VHT AP transmitting Beacon frames every 100 ms in the 5 GHz band), the PPDU carrying such frames may be customized (e.g. carrying additional LTFs) to be concurrently used for unsolicited channel measurements.

Figure 13:
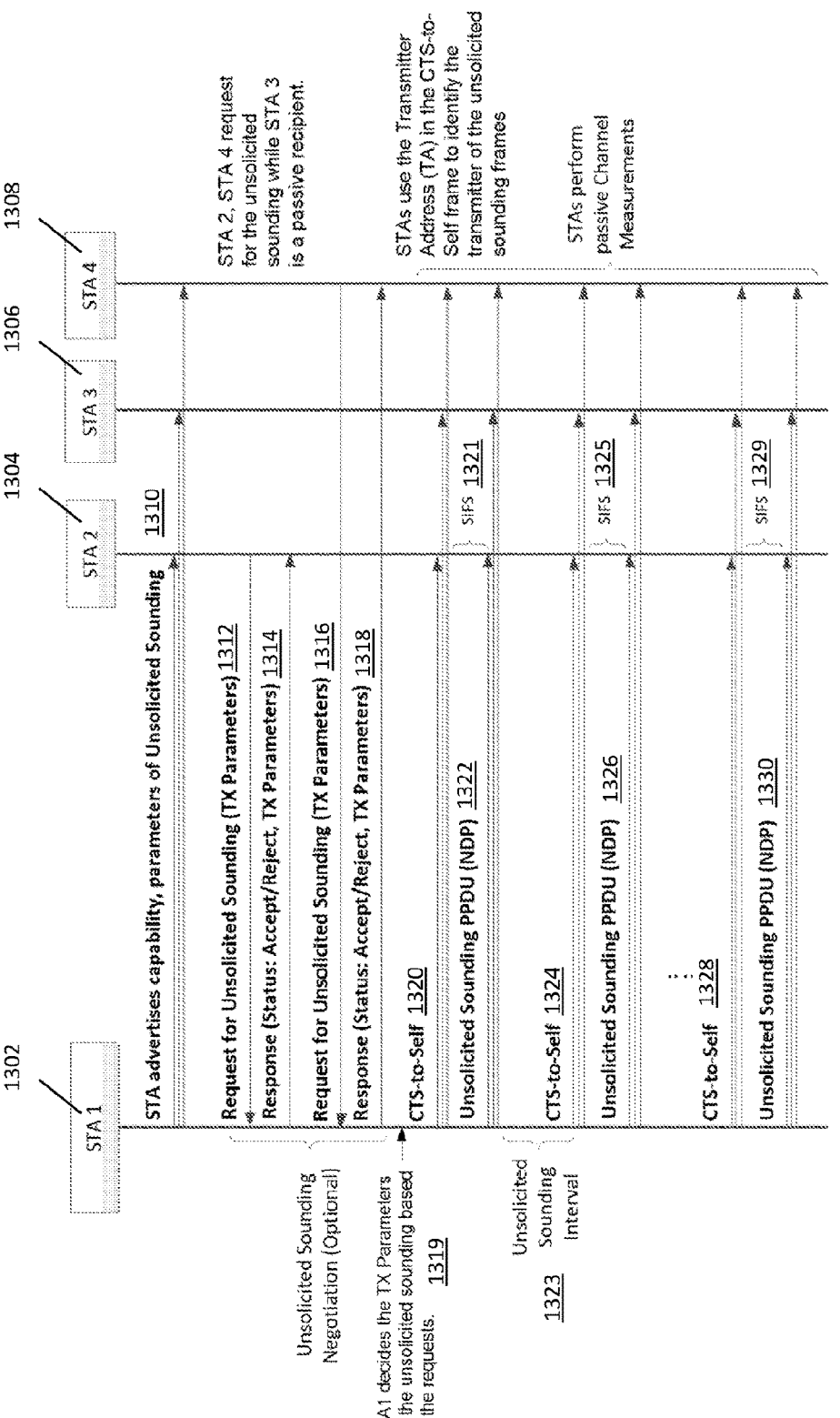
FIG. 13 depicts a flow diagram illustrating communications for unsolicited channel measurements according to the first embodiment.

FIG. 13 depicts a flow diagram 1300 illustrating communications for unsolicited channel measurements according to the first embodiment. The process for unsolicited channel measurements may start in step 1310 when a WLAN sensing transmitter, in this case STA1 1302, advertises its sounding capabilities and transmission parameters of unsolicited sounding to WLAN sensing receivers, in this case STA2 1304, STA3 1306 and STA4 1308. Optionally, the receivers such as 1304, 1308 may perform unsolicited negotiation with the transmitter 1302. In this case, in step 1312, the STA2 1304 transmits a request frame for unsolicited sounding comprising transmission parameters based on its own and transmitter's capabilities to the STA1 1302, and in step 1314, the STA1 1302 then transmits a response frame to accept or reject the transmission parameters to the STA2 1304. Subsequently, in step 1316, the STA4 1308 transmits a request frame for unsolicited sounding comprising transmission parameters based on its own and transmitter's capabilities to the STA1 1302, and in step 1318, the STA1 1302 then transmits a response frame to accept or reject the transmission parameters to the STA4 1308. In step 1319, the STA1 then decides the transmission parameters for the unsolicited sounding based on the requests during the unsolicited sounding negotiation stage. Alternatively, the transmission parameters and transmission periodicity of the unsolicited Sounding PPDUs may be decided by the Sensing application (e.g. running in a central server). The trigger to start the transmission of the unsolicited Sounding PPDUs may also come from the Sensing application (e.g. for the motion detection application depicted in FIG. 8, the unsolicited Sounding PPDUs may be transmitted at 20 μS periodicity during out of office hours: 8 pm-8 am every day etc.).

During unsolicited channel measurements, the transmitter 1302 may transmit a CTA-to-Self frame in steps 1320, 1324, 1328 followed by an unsolicited sounding PPDU (NDP) in steps 1322, 1326, 1330 to all the receivers simultaneously in a periodic basis after every unsolicited sounding interval 1323. The receivers STAs, STA2-4, 1304, 1306, 1308 use the TA address in the CTS-to-Self frame to identify the transmitter 1302 of the unsolicited sounding frames. Subsequently, each receiver performs its own channel measurements based on the received unsolicited sounding PPDUs.

It is noted that if the transmission time of the Unsolicited Sounding is same as or very close to the target beacon transmission times (TBTT), and the Beacon frame is not a delivery traffic indication map (DTIM) Beacon, the STA may transmit the Unsolicited Sounding PPDU SIFS after the Beacon frame. Since the TA field of the Beacon frame can be used to identify the transmitter of the Unsolicited Sounding PPDU, CTS-to-Self frames need not be transmitted in such cases. Although Beacon frames are typically transmitted only on the primary 20 MHz channel, the Unsolicited Sounding PPDU may be transmitted on a wider bandwidth if the secondary channels indicate IDLE clear channel assessment (CCA) within the SIFS.

Similarly, if the periodicity of the Sounding PPDUs match the transmission times e.g. of FILS Discovery frames in the 6 GHz band, the Sounding PPDUs (e.g. NDPs) may be transmitted SIFS after the transmission end time of the FILS Discovery frames. The receivers can identify the transmitter of the NDPs by identifying the TA field of the FILS Discovery frames.

Figure 14:
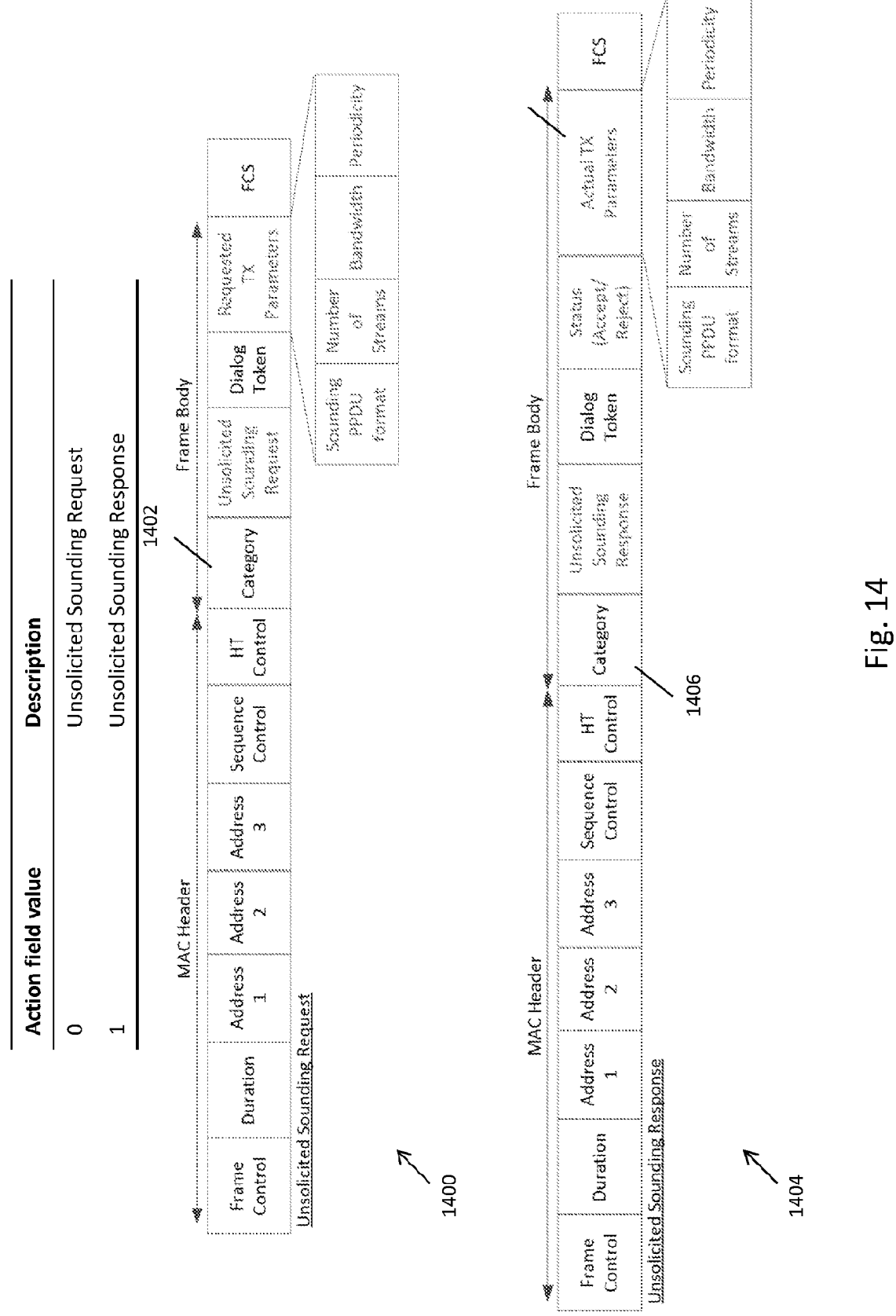
FIG. 14 depicts an example unsolicited sounding request frame and an example unsolicited sounding response frame for unsolicited channel measurements.

A new type of Action frames is defined as the Unsolicited Sounding Request frame and Unsolicited Sounding Response frame used, e.g. in FIG. 13, for unsolicited sounding negotiation between the transmitter and the receiver prior to transmission of unsolicited sounding PPDUs. FIG. 14 depicts an example Unsolicited Sounding Request frame and an example Unsolicited Sounding Response frame for unsolicited channel measurements. The Category field 1402, 1406 indicates a new type of Action frames for WLAN Sensing, while the immediately following Action field indicates various types of frames used for WLAN Sensing; an Action field value of 0 is defined to refer to an Unsolicited Sounding Request frame and an Action field value of 1 is defined to refer to as an Unsolicited Sounding Response frame.

An Action frame 1400, 1404 may comprise a Frame Control field, a Duration field, three Address fields, a Sequence Control field, a HT Control field, a Category field (or Action field) 1402, 1406, a Dialog Token field and a Frame Check Sequence (FCS) field. The Frame Control field, the Duration field, the three Address fields, the Sequence Control field and the HT Control field may be grouped as MAC header while the Category field (or Action field) 1402, 1406, the Dialog Token field may be grouped under frame body. Depending on the Category field or Action field value defining its function for unsolicited WLAN sensing, additional fields may be included in the frame body of the Action frames 1400, 1406. For instance, where the Category field 1402 indicates WLAN Sensing and the Action field has a value of 0 referring to an Unsolicited Sounding Request, the Action frame 1400 may function as an Unsolicited Sounding Request frame and further comprise an Unsolicited Sounding Request field, a Requested TX Parameters field in the frame body. The Requested TX Parameters field may include a Sounding PPDU Format subfield, a Number of Stream subfield, a Bandwidth subfield and a Periodicity subfield.

On the other hand, where the Category field 1406 indicates WLAN Sensing and the Action field has a value of 1 referring to an Unsolicited Sounding Response, the Action frame 1404 may function as an Unsolicited Sounding Response frame and further comprises an Unsolicited Sounding Response field, a Status (Accept/Reject) field and an Actual TX Parameters field in the frame body. The Actual TX Parameters field may include a Sounding PPDU Format subfield, a Number of Stream subfield, a Bandwidth subfield and a Periodicity subfield.

Figure 15A:
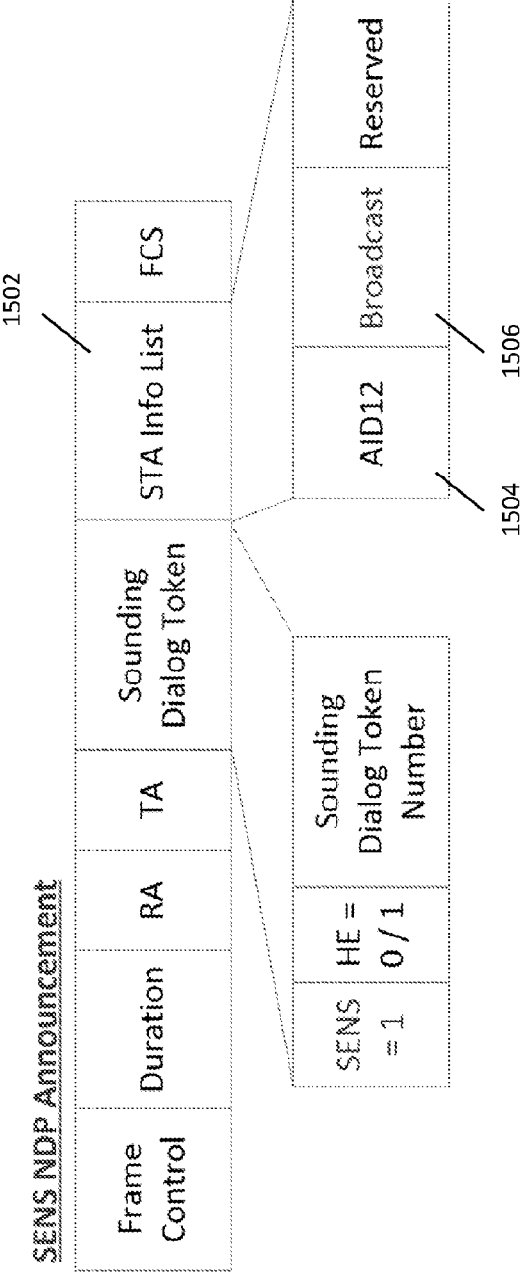
FIG. 15A depicts an example SENS null data packet (NDP) Announcement frame for unsolicited channel measurements.

According to the present disclosure, a new SENS NDP Announcement may also be defined to announce unsolicited NDPs. FIG. 15A depicts an example SENS Announcement frame 1500 for unsolicited channel measurements. The SENS NDP Announcement frame 1500 may comprise a Frame Control field, a Duration field, a RA field, a TA field, a Sounding Dialog Token field, a STA Info list field 1502 and a FCS field. The RA field may comprise a Broadcast MAC Address subfield. The Sounding Dialog Token field may comprise a SENS subfield which set to 1, a HE subfield (either is set to either 0 or 1) and a Sounding Dialog Token Number subfield. The STA Info List field comprises a AID12 subfield 1504, a Broadcast subfield 1506. The Broadcast subfield 1506, if set to 1, indicates that unsolicited broadcast NDP will follow and recipients are not expected to return beamforming feedback frames. If the Broadcast subfield 1506 bit is set to 1, instead of the recipient's AID, the AID12 subfield 1504 may be set to the BSS Color (of the BSS) or Group ID (of the Sensing Group) or Session ID (of the Sensing Session) to help the receivers classify the following NDP.

If the SENS NDP Announcement frame uses the format of HE NDP Announcement frame (i.e. the HE bit is also set to 1 in the Sounding Dialog Token), the STA Info list is 4 octets long and may also carry the Transmit Power used for the following HE NDP. The Transmit Power information may be used by the receivers to normalize the receive power value of the NDPs to avoid fluctuations in the CSI Amplitude values due to variations in the Transmit Power of different (unsolicited) NDPs.

Each of the 11bf receivers perform channel measurements and pass the CSI results to the respective upper layer WLAN Sensing applications, which may perform further processing on the CSI results (smoothing, compression etc.) and transfer the results, for example to a central server via wired communication links as depicted in the figure in slide 42. One or more WLAN Sensing client applications running on the server may make use of the consolidated CSI results from multiple 11bf devices to derive application specific results (motion, presence etc.).

Figure 15B:
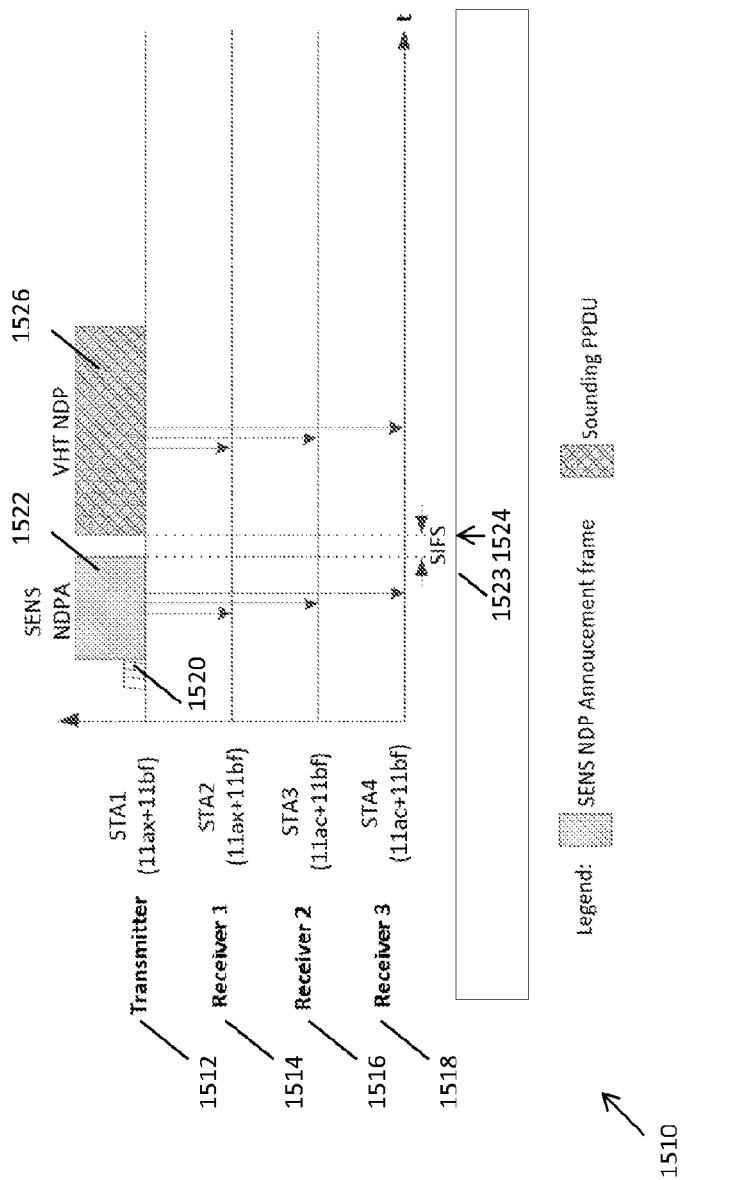
FIG. 15B depicts a flow diagram illustrating communications between a sensing transmitter and three sensing receivers for unsolicited channel measurements according to the first embodiment.

FIG. 15B depicts a flow diagram 1502 illustrating communications between a sensing transmitter 1512 and three sensing receivers 1514, 1516, 1518 for unsolicited channel measurements according to the first embodiment. Contention-based channel access procedure, e.g. EDCA procedure, is illustrated by block 1520, and a SIFS 1523 is illustrated. The sensing transmitter 1512 transmits a SENS NDP Announcement (SENS NDPA) frame 1522 in a broadcast manner (and received by all three sensing receivers 1514, 1516, 1518). After the last symbol of the SENS NDPA frame 1522 is transmitted, a SIFs may take effect, and the sensing transmitter 1512 then again transmits a Sounding PPDU 1526, for example VHT NDP in this case, in a broadcast manner (received by all three sensing receivers 1514, 1516, 1518). Subsequently, each of the sensing receivers 1514, 1516, 1518 uses the Sounding PPDU 1526 to perform channel measurements, while the SENS NDPA frame 1522 is used to identify the Sensing transmitter, Sensing Group/Session etc.

According to various embodiments of the present disclosure, a dedicated sensing service access point (SENS-SAP) may be defined or the existing MAC layer management entity SAP (MLME-SAP) may be enhanced to allow higher layer applications to adjust WLAN sensing related MAC/PHY parameters, to request the MLME to initiate channel measurements and for the MLME to pass the channel measurements information to the higher layer application.

In an embodiment, a sensing requester like STA1 1002 in FIG. 10 may comprise a MAC interface configured to obtain sensing parameters from higher layer applications. The MAC interface comprises a primitive, e.g. MLME-Sensing.request(Responder MAC Address, Group IP, Member ID List, Session ID, Sounding PPDU format, Number of Stream, Bandwidth, Request Type and NDPA information), whose purpose is to initiate solicited channel measurements and request for a transmission of Request frame like 1008 to one or more sensing responder like STA2 1004 in FIG. 10. Such primitive may be issued by higher layer applications and passed from the higher layer applications to the sensing requester like STA1 1002 in FIG. 10. Upon receipt of the primitive, the MLME of the sensing requester may then construct a sounding request frame for transmission to one or more sensing responders. More details on the parameters included in the MLME-Sensing.request( )primitive (herein-after referred to as ".request primitive") can be found in Table 2.

Specifically, regarding Request Type parameter, the term "Solicited Serial" means that sounding PPDUs are requested to be transmitted serially, e.g. issued by the sensing application running on STA1 1202 in FIG. 12B. The term "Solicited Joint" means that SENS NDPA and Sounding PPDUs are jointly transmitted by the requester, e.g. issued by the sensing application running on STA1 of FIG. 23. The term "Unsolicited" means that a device is requested to perform channel measurements based on the received unso-licited sounding PPDUs. When this option is requested, fields that are included in the request frame (PPDU format, number of streams, bandwidth etc) may be omitted in the .request primitive. If the request parameters are included in the .request primitive, the request for unsolicited sensing may also trigger the subscription for the unsolicited sound-ing service as shown in FIG. 13. For sensing applications requiring frequent periodic reporting of the channel mea-surements (e.g. CSI values) for example when using unso-licited sounding, consecutive channel measurements may be highly correlated. The .request primitive may also include a threshold value such that the device only reports new CSI values that differ from previous CSI values by greater than the threshold value. If the change in the CSI values is less than the threshold value, the new CSI values are not reported to the upper layers. For example, average correlation between a new CSI and a previous CSI can be used as the threshold. A high value of the threshold indicates low correlation, while a low value indicates high correlation.

In another embodiment, a sensing requester like STA1 1002 in FIG. 10 may comprise a MAC interface comprising another primitive, e.g. MLME-Sensing.confirm(Responder MAC Address, Session ID, PPDU format, Bandwidth, Channel Matrix Type, NumberOfSubcarriers_Ns, Num-berOfColumns_Nc, NumberOfReceiveChains_Nr, Num-berOfBitsPerElement_Nb, ChannelMatrix, SNRList), whose purpose is to report the results of (solicited/unsolic-ited) channel measurements. Such primitive is generated by the sensing requester like STA1 1002 upon receipt of a Sounding PPDU like 1010 from the sensing responder 1004 in FIG. 10, and issued by the sensing requester like STA1 1002 to its higher layer applications. More details on the parameters included in the MLME-Sensing.confirm( )primi-tive (hereinafter referred to as ".confirm primitive") can be found in Table 3.

Figures 25A, 25B:
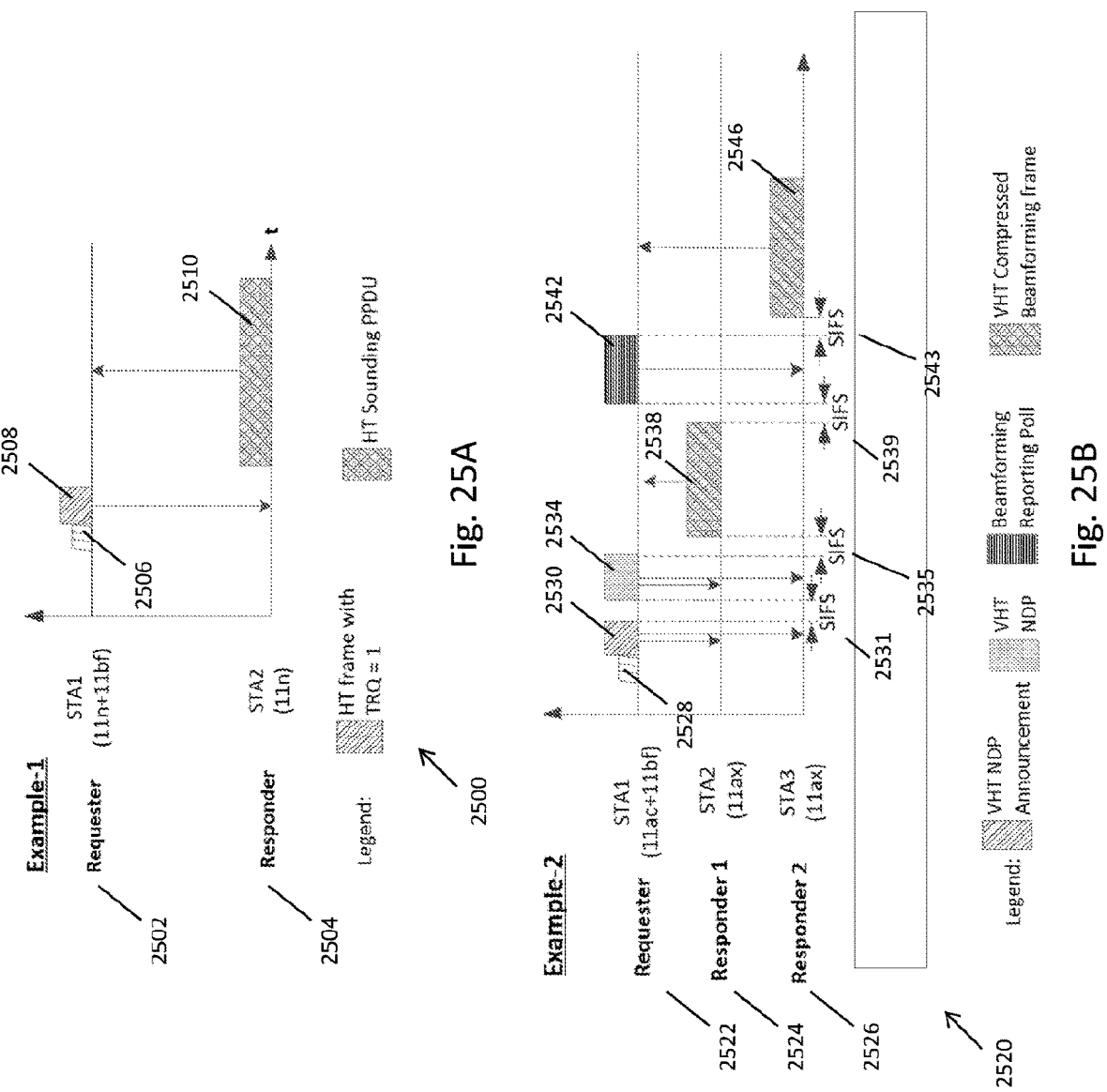
FIG. 25A depicts a flow chart illustrating communications between an 802.11bf capable STA and a non-802.11bf capable STA for WLAN sensing.
FIG. 25B depicts a flow chart illustrating communications between an 802.11bf capable STA and two non-802.11bf capable STAs for WLAN sensing.

Specifically, channel Matrix Type other than CSI may be used when the channel measurement is based on the com-pressed/noncompressed feedback frames received from legacy STAs (which will be further elaborated in the sixth embodiment and FIGS. 25A-B). When channel measure-ments are performed by the Requester/Receiving STA itself based on Sounding PPDUs, CSI channel matrix type may be used as the default choice. As explained earlier, if the .request primitive includes a threshold value, the device only generates the .confirm primitive to report the new CSI values that differ from previous CSI values by greater than the threshold value. If the changes in CSI values is less than the threshold value, the .confirm primitive is not generated.

Yet in another embodiment, for unsolicited channel mea-surements, a sensing transmitter like STA1 1300 in FIG. 13 may comprise a MAC interface comprising a primitive, e.g. MLME-Unsolicited-Sounding.request(PPDU format, Band-width, Number of Streams, SoundingPeriod), whose pur-pose is to request MLME to start periodic unsolicited sounding. Such primitive is issued by higher layer applications to the sensing transmitter like STA1 1300 in FIG. 13. Upon receipt of the primitive, the MLME of the sensing transmitter generates periodic instructions to the PHY to transmit Sounding PPDUs (by issuing PHY-TXSTART.re-quest primitives), once every SoundingPeriod. More details on the parameters included in the MLME-Unsolicited-Sounding.request( )primitive can be found in Table 4.

According to various embodiments of the present disclo-sure, a dedicated sensing physical layer management entity (SENSE-PLME-SAP) may be defined or the existing PLME-SAP may be enhanced to allow the MLME to adjust WLAN sensing related PHY parameters and for the PLME to pass the information related to the received Sounding frames to the MLME.

In an embodiment, a sensing requester like STA1 1002 in FIG. 10 may comprise a PHY interface comprising a primi-tive, e.g. PLME-Configure-ChannelMatrixType.request (CHAN_MAT_TYPE), which purpose is to configure a desired channel matrix type to use to report the results of channel measurements to the MAC layer. Such PLME primitive may be issued by the MAC layer of the sensing requester like STA1 1002 in FIG. 10 to its PHY. Upon receipt of the PLME primitive in the PHY, the PLME configures the PHY to report the CHAN_MAT parameter in the RXVECTOR in the requested Channel Matrix type. It also sets the CHAN_MAT_TYPE parameter of the RXVEN-TOR to the requested Channel Matrix type. More details on the parameter CHAN_MAT_TYPE included in the PLME primitive can be found in Table 5.

In the following paragraphs, a second embodiment of the present disclosure is explained with reference to a sensing requester and a sensing responder for solicited channel measurements which in turn are used for WLAN sensing.

According to the second embodiment of the present disclosure, the format and the bandwidth of the Response PPDU is implicitly indicated by the format of the PPDU carrying the Request frame. In this embodiment, the request-ing STA uses the same PPDU format and bandwidth to carry the Request frame as those to be requested from the Response PPDU. The Responding STA uses the PPDU format and bandwidth for the Response PPDU that are the same as those used to carry the Request frame. In this embodiment, it is noted that using PPDU format other than non-HT as the initial PPDU in a TXOP may cause risk of third party STAs not being able to correctly receive the initial PPDU and thereby not being able to set the Network Allocation Vector (NAV) that is used to protect the TXOP, and Request To Send/Clear To Send (RTS/CTS) frames exchange carried in non-HT/non-HT duplicate PPDUs is necessary to protect the subsequent PPDU exchange.

Figures 16A, 16B:
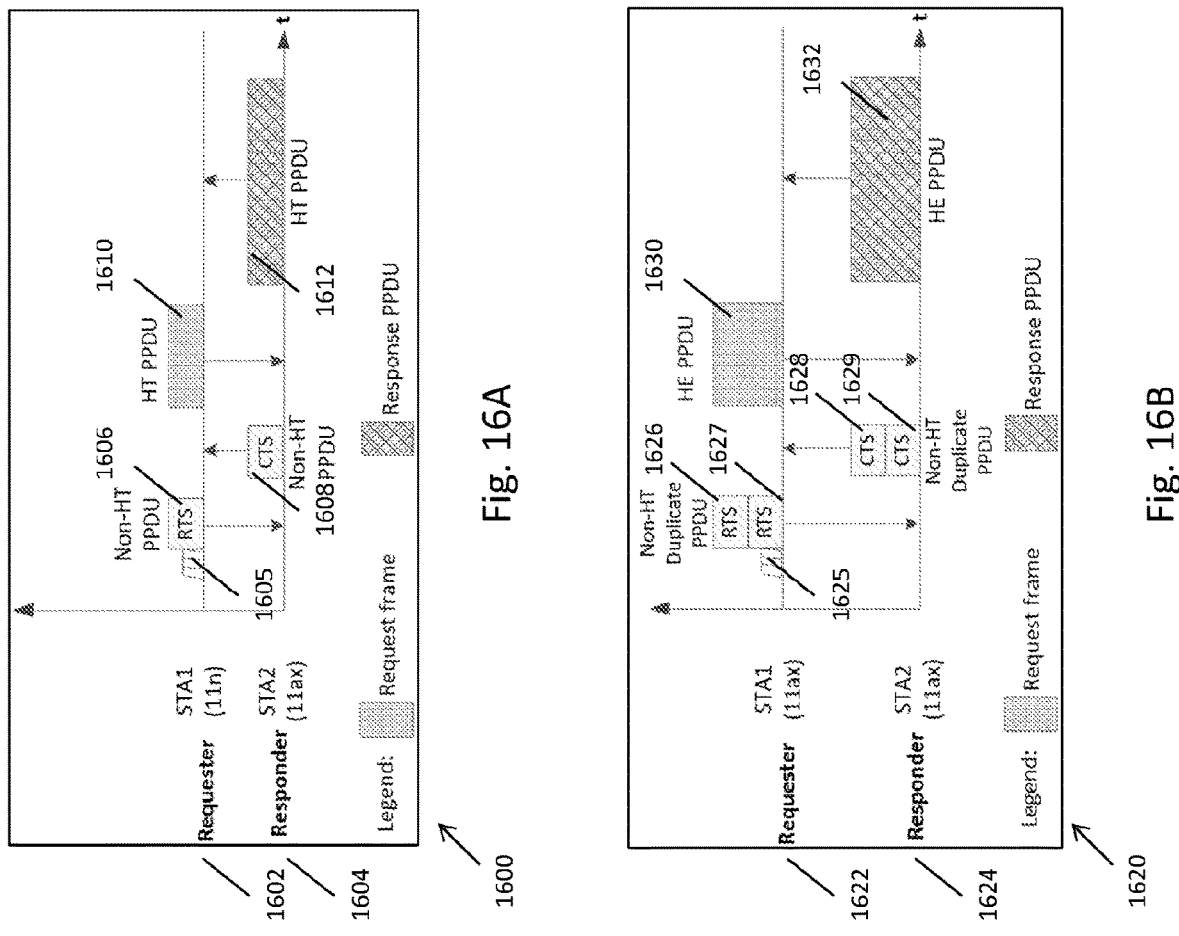
FIGS. 16A-B depict two flow diagrams illustrating communications between a sensing requester and a sensing responder for solicited channel measurements according to a second embodiment of the present disclosure.

FIG. 16A depicts a flow diagram 1600 illustrating com-munications between a sensing requester and a sensing responder for solicited channel measurements according to the second embodiment of the present disclosure.

Contention-based channel access procedure, e.g. EDCA procedure, is illustrated by block 1605. The sensing requester 1602 transmits a RTS frame 1606 carried in a non-HT PPDU to the sensing responder 1604. Subsequently, the sensing responder 1604 transmits a CTS frame 1608 carried in a non-HT PPDU to the sensing requester 1602. In this example, after the RTS/CTS frames exchange, the sensing requester 1602 transmits a 20 MHz HT PPDU carrying a Request frame 1610 to the sensing responder 1604. Subsequently, the sensing responder 1604 transmits a Response PPDU 1612 (a 20 MHz HT PPDU) under the same format and bandwidth as those of the PPDU carrying the Request frame 1610. The sensing requestor 1602 uses the received 20 MHz HT Response PPDU 1612 to perform channel measurements.

FIG. 16B depicts another flow diagram 1620 illustrating communications between a sensing requester and a sensing responder for solicited channel measurements according to the second embodiment of the present disclosure.

Contention-based channel access procedure, e.g. EDCA procedure, is illustrated by block 1625. The sensing requester 1622 jointly transmits two RTS frames 1626, 1627 carried in a 40 MHz non-HT duplicate PPDU to the sensing responder 1624. Subsequently, the sensing responder 1624 jointly transmits two CTS frame 1628, 1629 carried in a 40 MHz non-HT duplicate PPDU to the sensing requester 1622. Similarly, in this example, after the RTS/CTS frames exchange, the sensing requester 1622 transmits a 40 MHz HE PPDU carrying a Request frame 1630 to the sensing responder 1624. Subsequently, the sensing responder 1624 transmits a Response PPDU 1632 (a 40 MHz HE PPDU) under the same format and bandwidth as those of the PPDU carrying the Request frame 1630. The sensing requestor 1624 uses the received 40 MHz HE Response PPDU 1632 to perform channel measurements.

In the following paragraphs, a third embodiment of the present disclosure is explained with reference to a sensing requester and a sensing responder for solicited channel measurements which in turn are used for WLAN sensing.

Figure 17:
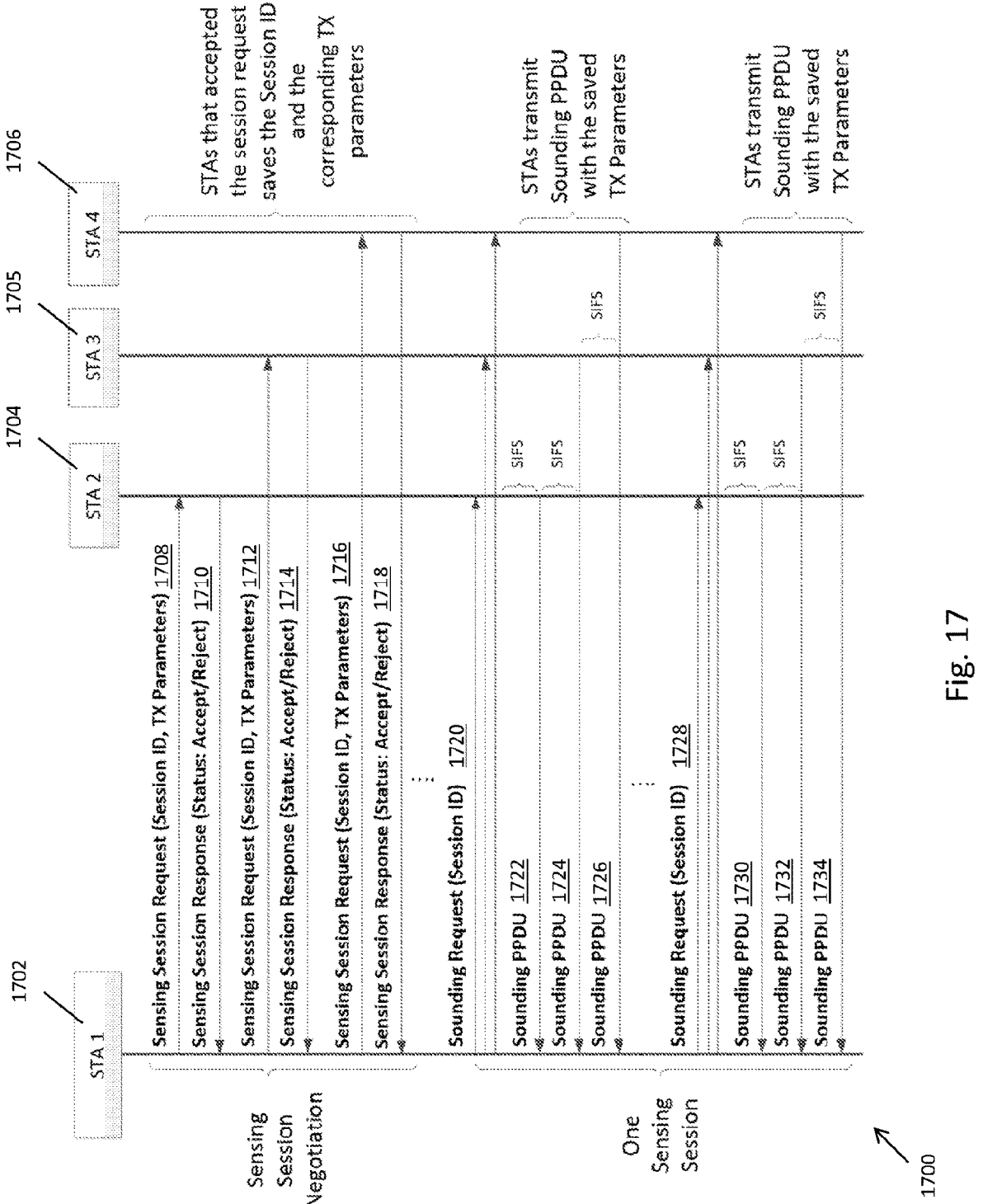
FIG. 17 depicts a flow diagram illustrating communications for sensing session negotiation and solicited channel measurements according to a third embodiment of the present disclosure.

According to the third embodiment of the present disclosure, the transmission parameter of the response PPDUs are negotiated between a sensing requester and one or more sensing responders during the setup phase of a WLAN sensing session and remain the same throughout a WLAN sensing session. FIG. 17 depicts a flow diagram 1700 illustrating communications for sensing session negotiation and solicited channel measurements according to the third embodiment of the present disclosure. The process for sensing session negotiation may start in step 1708 when a WLAN sensing requester, in this case STA1 1702, transmits a sensing session request frame comprising a Session ID and transmission parameters for subsequent solicited channel measurements to a first sensing receiver, in this case STA2 1704. In step 1710, the first sensing receiver 1704 then transmits a sensing session response frame comprising a status to accept or reject the request. Subsequently, in step 1712, the sensing requester 1702 transmits a sensing session request frame comprising a Session ID and transmission parameters to a second sensing receiver, in this case STA3 1705. Similarly, in step 1714, the second sensing receiver 1705 then transmits a sensing session response comprising a status to accept or reject the request. Subsequently, the same steps of transmitting a sensing session request frame from the sensing requester 1702 to a third sensing receiver STA4 1706 and transmitting a sensing session response frame comprising a Session ID and transmission parameters from the third sensing receiver 1706 to the sensing requester to accept or reject the request are carried out in step 1716 and 1718 respectively. The STAs that accepted the session request saves the Session ID and the corresponding TX parameters. As such, the process for sensing session negotiation may complete.

According to the embodiment, the parameters such as Session ID and transmission parameters accepted by the sensing receivers, in this case 1704-1706, during the sensing session negotiation stage will be used for subsequent solicited channel measurements and will remain the same throughout the WLAN sensing session. In particular, subsequent to the sensing session negotiation stage, the process for solicited channel measurements may start in step 1720 when the sensing requester 1702 transmits a sounding request frame comprising the Session ID simultaneously to all the sensing receivers 1704-1706. A SIFS may take effect. The sensing receivers 1704-1706 then transmit respective Sounding PPDUs with the saved TX parameters sequentially with a gap of SIFS between the Sounding PPDUs, as illustrated in steps 1722, 1724, 1726. Subsequently, second solicited channel measurements may be performed within the sensing session. The process for the second solicited channel measurements may start in step 1728 when the sensing requester 1702 transmits again another sounding request frame comprising the same Session ID simultaneously to all the sensing receivers 1704-1706. A SIFS may take effect. The sensing receivers 1704-1706 then again transmit respective Sounding PPDUs with the saved TX parameters sequentially with a gap of SIFS between the Sounding PPDUs, as illustrated in steps 1730, 1732, 1734.

Figure 18:
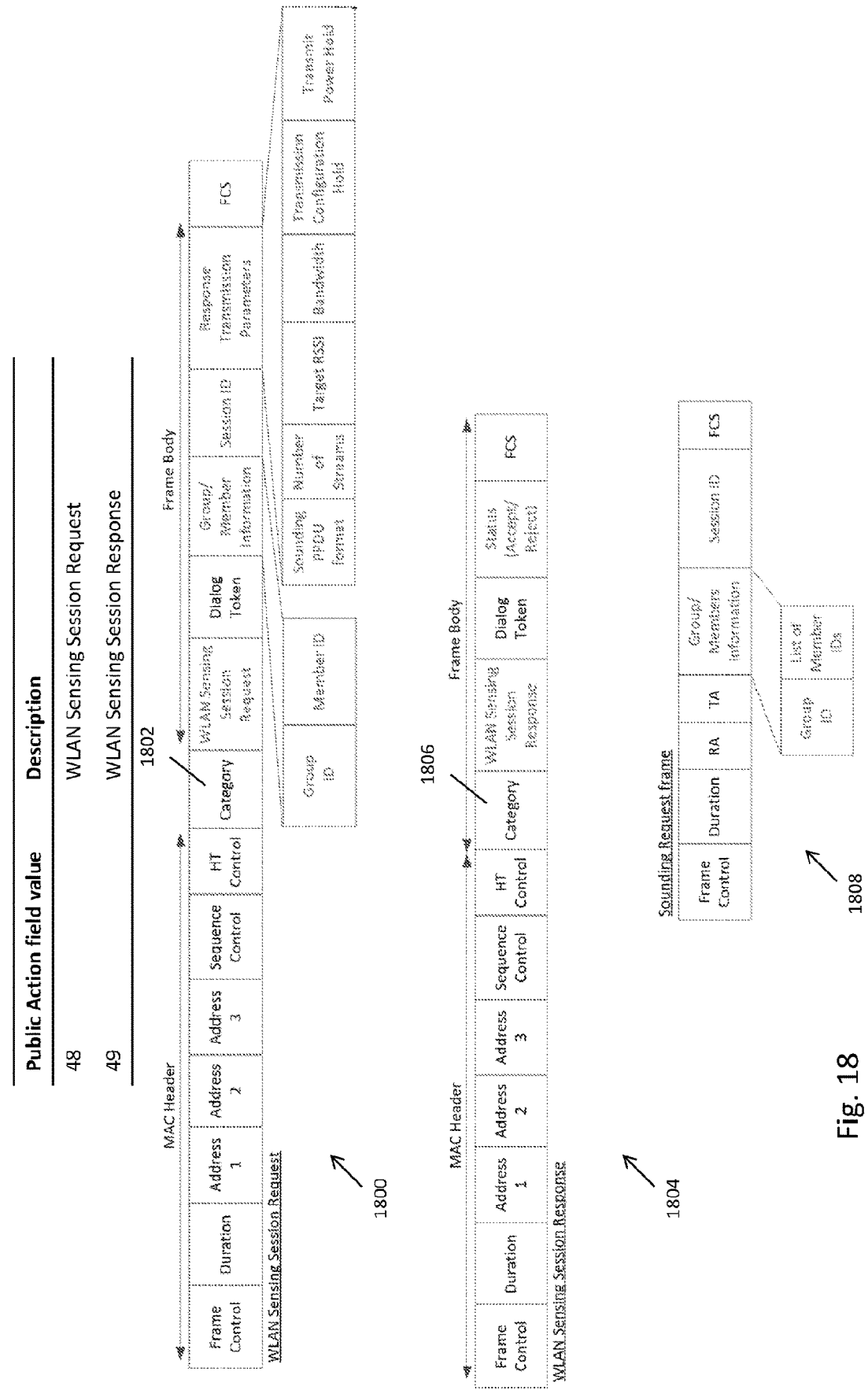
FIG. 18 depicts an example WLAN Sensing Session Request frame 1800, an example WLAN Sensing Session Response frame 1804 and an example sounding request frame 1808 according to the third embodiment.

According to the third embodiment, two Public Action frames are defined as the WLAN Sensing Session Request frame and the WLAN Sensing Session Response frame used, e.g. in FIG. 17, for WLAN sensing session negotiation. FIG. 18 depicts an example WLAN Sensing Session Request frame 1800, an example WLAN Sensing Session Response frame 1804 and an example sounding request frame 1808 according to the third embodiment. Public Action frames are Class 1 frames and can be used to communicate with unassociated STAs. When the Category field 1802, 1806 indicate Public Action frame, a Public Action field value of 48 is defined to refer to a WLAN Sensing Session Request and a Public Action field value of 49 is defined to refer to a WLAN Sensing Session Response.

A Public Action frame 1800, 1804 may comprise a Frame Control field, a Duration field, three Address fields, a Sequence Control field, a HT Control field, a Category field (or Public Action field) 902, 908, a Dialog Token field and a Frame Check Sequence (FCS) field. The Frame Control field, the Duration field, the three Address fields, the Sequence Control field and the HT Control field may be grouped as MAC header while the Category field 1802, 1806, the Public Action field and the Dialog Token field etc. may be grouped under frame body. Depending on the Category field or Public Action field value defining its function for WLAN sensing group formation, additional fields may be included in the frame body of the Public Action frames 1800, 1806. In this embodiment, where the Public Action field has a value of 48 referring to a WLAN Sensing Session Request, the Public Action frame 1800 may function as a WLAN Sensing Session Request frame and further comprise a WLAN Session Request field, a Group/Member Information field, a Session ID field and a Response Transmission Parameters field in the frame body. The Group/Member Information field comprises a Group ID subfield and a Member ID subfield. The Response Transmission Parameter field may comprise a Sounding PPDU Format subfield, a Number of Streams subfield, a Target RSSI subfield, a Bandwidth subfield, a Transmission Configuration Hold subfield and a Transmit Power Hold subfield.

On the other hand, where the Public Action field has a value 49 referring to a WLAN Sensing Session Response, the Public Action frame 1806 may function as a WLAN Sensing Session Response frame and further comprise a WLAN Sensing Session Response field and a Status (Accept/Reject) field in the frame body.

The Sounding Request frame 1808 used, e.g. in FIG. 17, for solicited channel measurements subsequent to sensing session negotiation may be a simplified version of the request frame 1100 in FIG. 11A and may comprise a Frame Control field, a Duration field, a RA field, TA field a Group/Members Information field, a Session ID field and a FCS field. The Group/Members Information may comprise a Group ID subfield and a List of Member IDs subfield. Although not shown in FIG. 18, the Sounding Request frame 1808 may also carry a Sounding Control field.

In the following paragraphs, a fourth embodiment of the present disclosure is explained with reference to a sensing requester and a sensing responder for solicited channel measurements which in turn are used for WLAN sensing.

According to the present disclosure, it is possible to solicit Response PPDUs from multiple sensing responders using Orthogonal frequency-division multiple access (OFDMA), for example, by requesting using a new variation of HE Trigger frame for WLAN sensing and responding using a HE Trigger-based (TB) Ranging NDPs (defined in IEEE 802.11az) transmitted on non-overlapping 20 MHz channels. It is noted that, this is different from HE TB Ranging NDPs transmitted over the whole bandwidth using different spatial streams in 802.11az. Further, HE TB PPDUs that do not carry a data field may also be utilized to achieve such multi-user sounding. Such HE TB PPDUs may be called HE TB Sensing NDP.

Figure 19:
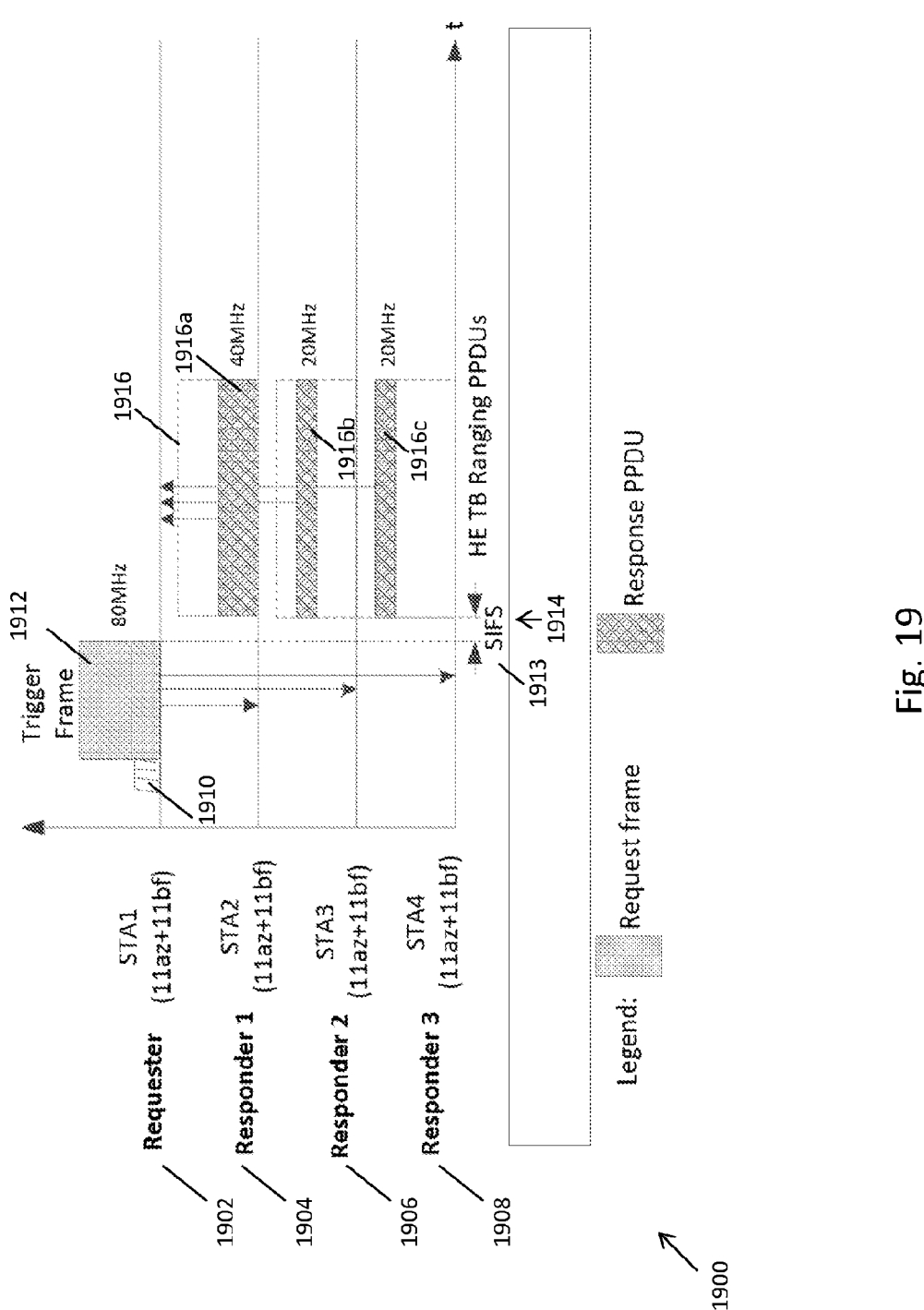
FIG. 19 depicts a flow diagram illustrating communications for solicited channel measurements from multiple sensing responders using Orthogonal frequency-division multiple access (OFDMA) according to a fourth embodiment of the present disclosure.

FIG. 19 depicts a flow diagram illustrating communications for solicited channel measurements from multiple sensing responders using OFDMA according to the fourth embodiment of the present disclosure. Contention-based channel access procedure, e.g. EDCA procedure, is illustrated by block 1910 and a SIFS 1913 is illustrated. The sensing requester 1902 transmits a trigger frame 1912 simultaneously to three sensing responders (STA2, STA3, STA4) 1904, 1906, 1908. In this example, the Request frame 1912 is requesting one 40 MHz Sounding PPDU from STA2 1904, one 20 MHz Sounding PPDU from STA3 1906 and one 20 MHz Sounding PPDU from STA4 1908. After the last symbol of the trigger frame 1912 is transmitted, a SIFS 1913 may take effect and at 1914, the sensing responder 1904 transmits a 40 MHz HE TB Ranging NDP 1916a in the first and second 20 MHz subchannels of the 80 MHz frequency segment; the sensing responder 1906 transmits a 20 MHz HE TB Ranging NDP 1916b in the third 20 MHz subchannel of the 80 MHz frequency segment; and the sensing responder 1908 transmits a 20 MHz HE TB Ranging NDP 1916c in the fourth 20 MHz subchannel of the 80 MHz frequency segment, where all three HE TB Ranging PPDUs 1916a-c are transmitted using OFDMA on non-overlapping 20 MHz subchannels simultaneously to the sensing requester 1902. Subsequently, the sensing requester 1902 uses the HE TB Ranging PPDUs 1916a-c to perform channel measurements for sensing responders 1904-1908 respectively.

Figure 20:
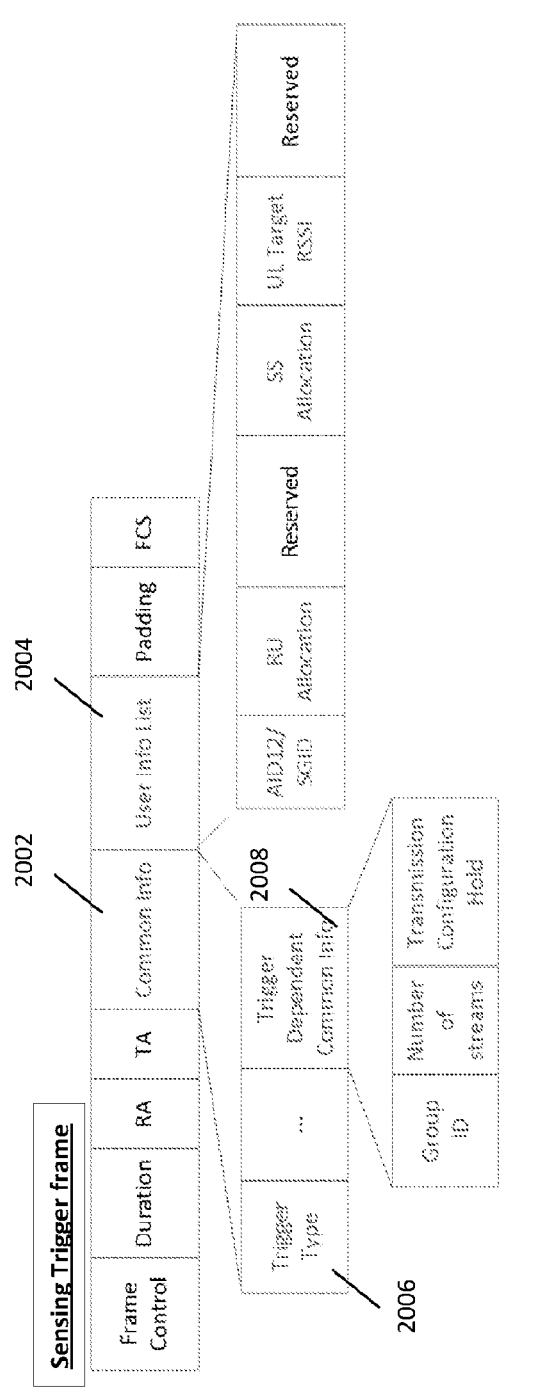
FIG. 20 depicts an example Sensing Trigger frame for soliciting Response PPDUs from multiple responders using OFDMA according to the fourth embodiment.

A new variation of HE Trigger frame is defined for WLAN Sensing and used for soliciting Response PPDUs from multiple responders using OFDMA according to the fourth embodiment of the present disclosure. FIG. 20 depicts an example Sensing Trigger frame used, e.g. as Trigger frame 1902 in FIG. 19, for soliciting Response PPDUs from multiple responders using OFDMA according to the fourth embodiment. The Sensing Trigger frame comprises a Frame Control field, a Duration field, a RA field, a TA field, a Common Info field 2002, a User Info List field 2004, a Padding field and a FCS field. The Common field 2002 further comprises a Trigger Type field 2006 and Trigger Dependent Common Info field 2008. The Trigger Type field indicates the new Trigger Type variant for sensing. The Trigger Dependent Common Info 2008 further comprises a Group ID subfield to indicate WLAN Sensing Group, a Number of Streams field to indicate the number of space time streams to be used for the response PPDU and a Transmission Configuration Hold subfield.

The User Info List field 2004 further comprises an AID12/SGID field, a RU Allocation field 2014 to indicate the Resource Unit to be used for the response PPDU, a Spatial Stream (SS) Allocation field and an Uplink (UL) Target RSSI field.

In the following paragraphs, a fifth embodiment of the present disclosure is explained with reference to coordinated channel measurements which in turn are used for WLAN sensing.

In use cases that require many channels to be measured (e.g. in motion/presence detection for security), WLAN sensing STAs may coordinate the channel measurements to reduce the channel measurement overheads. In such embodiment, a sensing requester may transfer an unused portion of a Transmission Opportunity (TXOP) to another sensing requester to perform its own WLAN sensing. Such coordinated channel measurements be useful when only a sub-set of 11bf devices are capable of performing channel measurements, and/or if channel measurements based on unintended sounding PPDUs (Slide 16) are not desired.

Figures 21A, 21B:
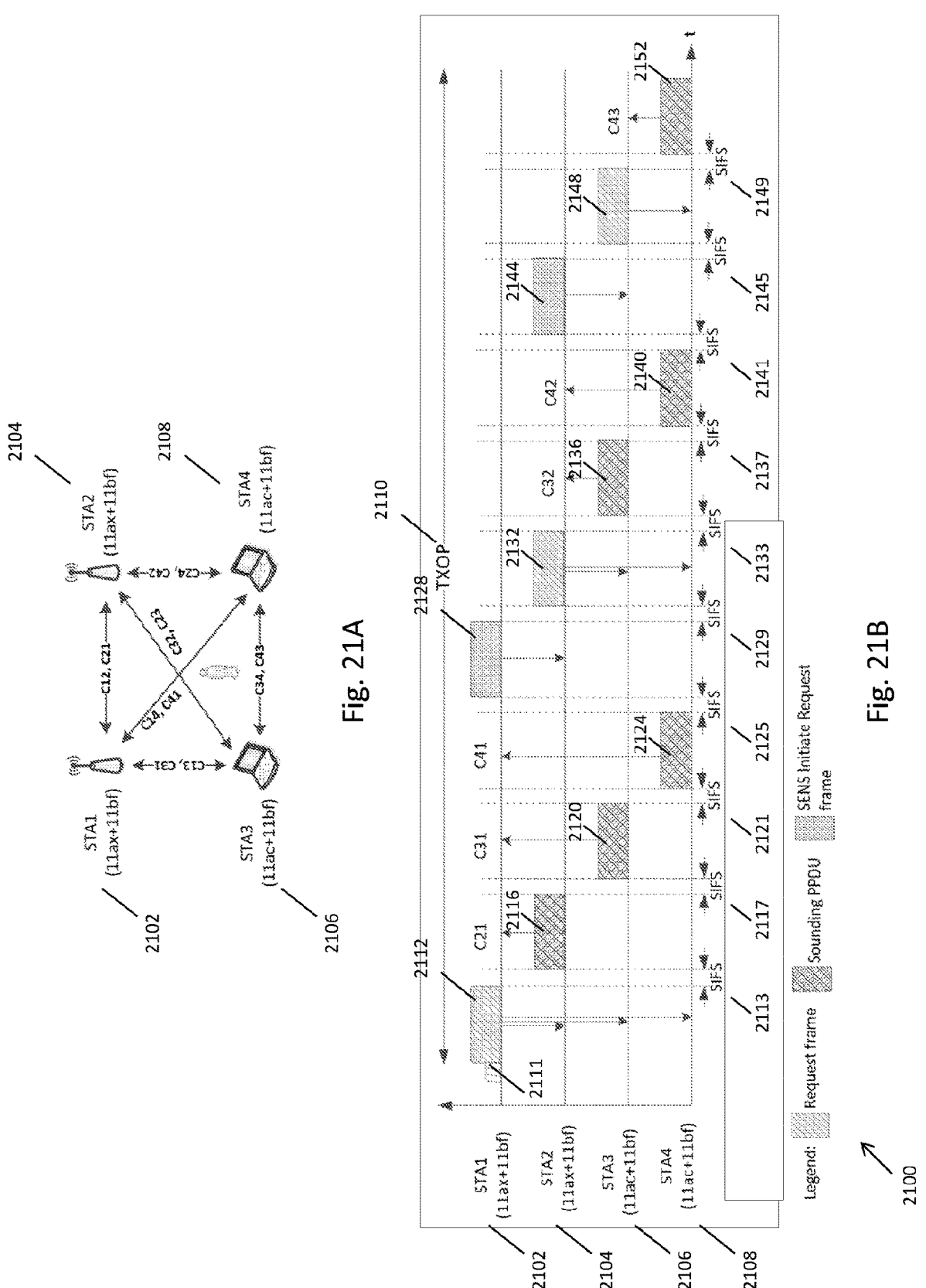
FIGS. 21A-B depict flow diagrams illustrating communications for coordinated channel measurements according to a fifth embodiment of the present disclosure.

FIGS. 21A-B depict flow diagrams illustrating communications for coordinated channel measurements according to the fifth embodiment. In this embodiment, members of a sensing group, i.e. STA1-4, can communicate with each other, thus resulting in a total number of six channels to be measured as illustrated by six two-way arrows in FIG. 21A correspondingly.

As shown in FIG. 21B, contention-based channel access procedure, e.g. EDCA procedure, is illustrated by block 2111, and SIFS 2113, 2117, 2122, 2129, 2133, 2137, 2141, 2146, 2149 are illustrated. Similar to solicited channel measurements in FIG. 12B, STA1 2102 transmits a Request frame 2112 to three STAs STA2 2104, STA3 2106 and STA4 2108. The Request frame 2112 may specifies IDs of STA3, STA4 and transmission parameters to be used by the Response PPDUs. After the last symbol of the Request frame 2112 is transmitted, a SIFS 2113 may take effect, and all three STA2, STA3 and STA4 transmit respective Response PPDUs 2116, 2120, 2124 sequentially with a gap of SIFS 2117, 2121 between the Response PPDUs 2116, 2120, 2124, as illustrated by three arrows C21, C31, C41, respectively. STA1 then uses the received Response PPDUs 2116, 2120, 2124 from STA2, STA3 STA4 to measure channels C21, C31 and C41, respectively.

Subsequently, if there is unused portion of the TXOP 2110, the STA1 2102 may transmit a SENS Initiate Request frame 2128 to transfer the unused portion (or remaining duration) of the TXOP 2110 to STA2. As a result, STA2 may then act as a sensing requester and transmit a Request frame 2132 to STA3, STA4 to request for Response PPDUs for channel measurements. The Request frame 2132 may specifies IDs of STA2, STA3, STA4 and transmission parameters to be used by the Response PPDUs. After the last symbol of the Request frame 2132 is transmitted, a SIFS may take effect, and both STA3 and STA4 transmit respective Response PPDUs 2136, 2140 sequentially with a gap of SIFS 2137 between the Response PPDUs 2136, 2140, as illustrated by two arrows C32, C42, respectively. STA2 then uses the received Response PPDUs 2136, 2140 from STA3, STA4 to measure channels C32 and C42, correspondingly.

Similarly, if there is still unused portion of the TXOP 2110, the STA2 2104 may then transmit a SENS Initiate Request frame 2144 to transfer the unused portion (or remaining duration) of the TXOP 2110 to STA3. As a result, STA3 may then act as a sensing requester and transmit a Request frame 2148 to STA4 to request for a Response PPDU for channel measurements. The Request frame 2148 may specifies IDs of STA4 and transmission parameters to be used by the Response PPDU. After the last symbol of the Request frame 2148 is transmitted, a SIFS may take effect, and STA4 transmit a Response PPDU 2152, as illustrated by an arrow C43, STA3 then uses the received Response PPDU 2152 from STA4 to measure channel C43. Advantageously, in this manner, channel measurements can be performed for all six channels in a single TXOP.

Figure 22:
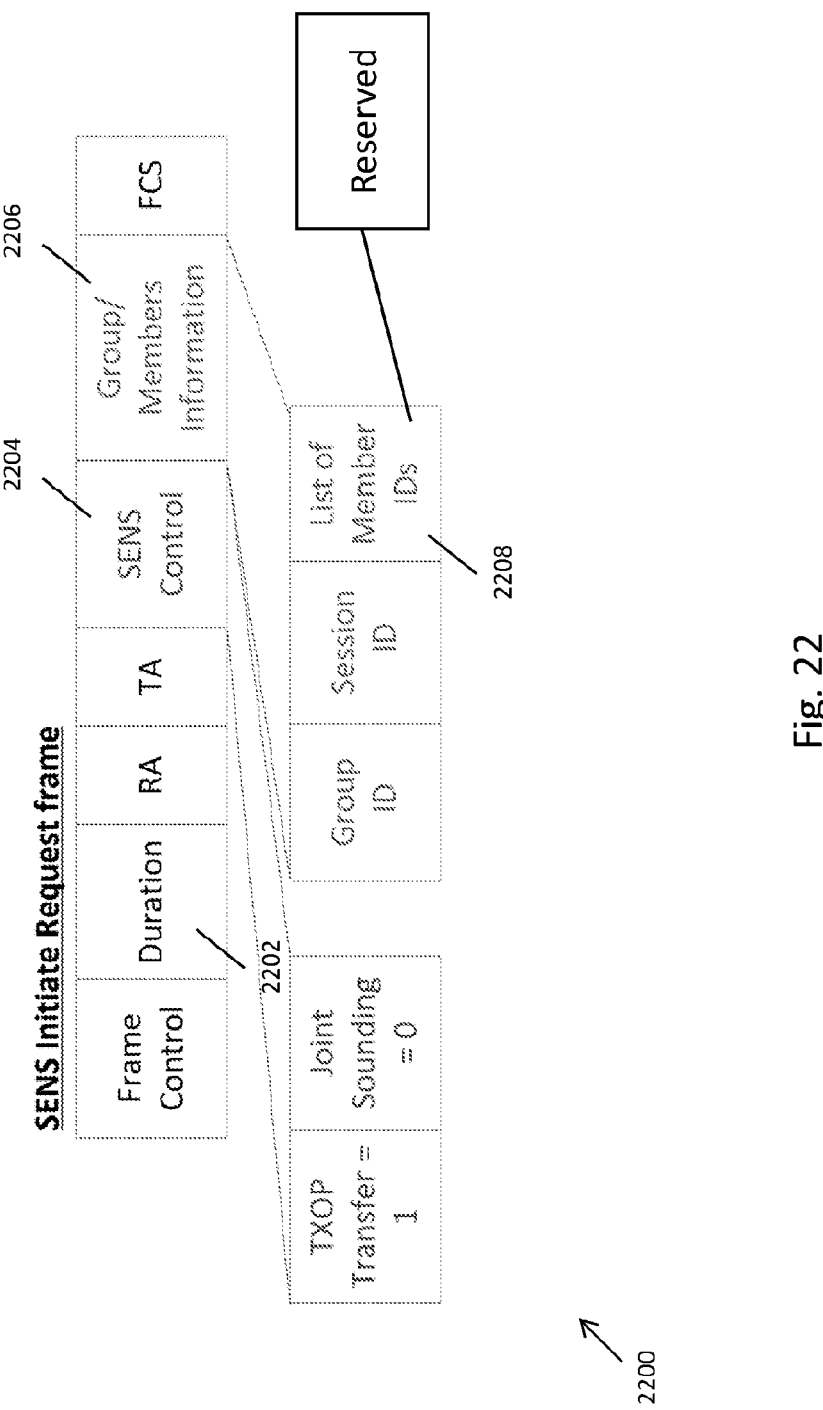
FIG. 22 depicts an example SENS Initiate Request frame 2200 for coordinated channel measurements.

A variation of the Sounding request frame, e.g. from that in FIG. 11A, is defined and used as a SENS Initiate Request frame to request another 11bf device to initiate its channel measurements. FIG. 22 depicts an example SENS Initiate Request frame 2200 for coordinated channel measurements. The SENS Initiate Request frame 2200 comprises a Frame Control field, a Duration field 2202, a RA field, a TA field and a SENS Control field 2204, a Group/Members Information field 2206 and a FCS field. The Duration field indicates the remaining TXOP duration. The SENS Control field 2204 comprises a TXOP Transfer field which is set to 1 to indicate the new variation of the Sounding request frame and a Joint Sounding which is set to 0. The Group/Members Information field 2206 comprises a Group ID field, a Session ID field and a List of Member IDs field 2208. In this example, the Group/Members Information may indicate the Group ID or the Session ID for the current channel measurements while the List of Member IDs field 2208 is reserved.

Alternatively, if a TXOP transfer control is also defined for data frames (e.g. for multi-AP Coordinated TDMA (C-TDMA)), one bit in the frame may be used to differentiate the frame for use in TXOP transfer for Sounding, in which case the TXOP recipient AP uses the remaining TXOP for sounding.

According to another example of the fifth embodiment for coordinated channel measurements, instead of serially sounding the channels for measurements, two or more WLAN sensing transmitters may sound the channel simultaneously in a joint manner. In particular, one sensing transmitter initiates the joint sounding (by transmitting a SENS Request Trigger frame to one or more Transmitters. Two or more sensing transmitters simultaneously transmit SENS NDPA (SIFS after transmitting/receiving the SENS Request trigger frame). The sensing transmitters simultaneously transmit Sounding PPDUs (SIFS after transmitting the SENS NDPA).

Figure 23:
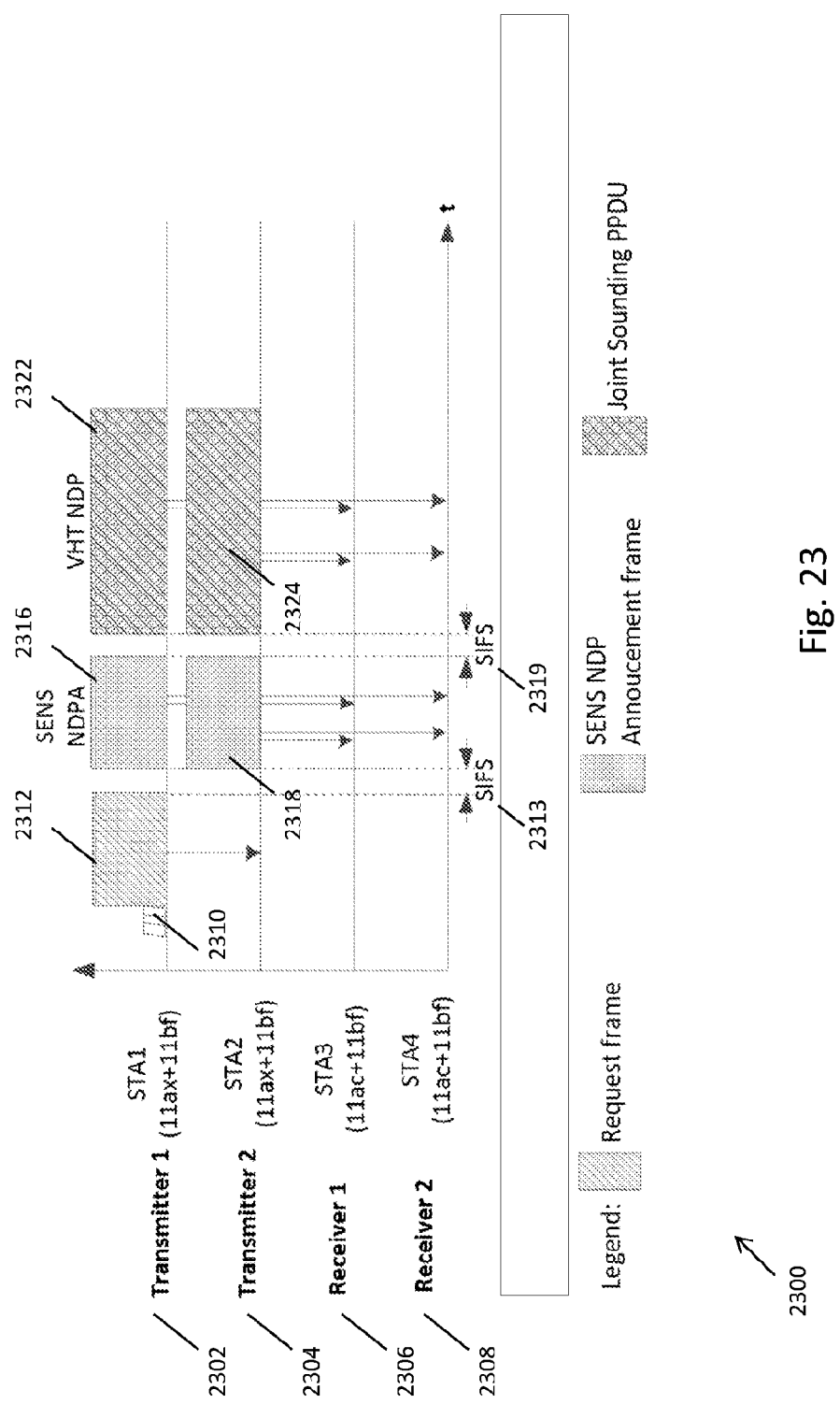
FIG. 23 depicts a flow chart illustrating communications for joint sounding and coordinated channel measurements according to the fifth embodiment.

FIG. 23 depicts a flow chart illustrating communications for joint sounding and coordinated channel measurements according to the fifth embodiment. Contention-based channel access procedure, e.g. EDCA procedure, is illustrated by block 2310. A sensing transmitter, e.g. sensing transmitter 1 2302, initiates joint sounding by transmitting a SENS Request Trigger frame 2312 to one or more sensing transmitter, e.g. sensing transmitter 2 2304. After the last symbol of the SENS Request Trigger frame like 2312 is transmitted, a SIFS 2313 may take effect, and two or more transmitters, e.g. sensing transmitter 1 2302 and sensing transmitter 2 2304, simultaneously transmit respective SENS NDPA frames 2316, 2318 to sensing receivers, e.g. sensing receiver 1 2306 and sensing receiver 2 2308.

After the last symbol of the SENS NDPA frames are transmitted, a SIFS 2319 may take effect, the two or more transmitter 2302, 2304 simultaneously transmit respective (joint) Sounding PPDUs, in this case VHT NDPs 2322, 2324, to sensing receivers 2306, 2308. Subsequently, the sensing receivers 2306 & 2308 use the received Sounding PPDUs to perform channel measurements (of the aggregated channel).

This example is based on an assumption that the sending transmitters are able to maintain tight synchronization (time, CFO). This mode may be called "Joint sensing" and may be useful in use cases that require channel measurements involving large numbers of transmitter and receivers, e.g. for whole office human motion detection like the case in FIG. 8. Instead of performing channel measurements serially, one channel at a time (e.g. T1 to R1, T1 to R2, T2 to R1, T2 to R2), performing Joint Sounding can help to reduce the airtime overhead of WLAN Sensing. Identical SENS NDPA frames are transmitted by all Transmitters. The following NDPs may also be identical or, the groups of tones of non-legacy LTFs of the NDPs may also be orthogonally coded. If HE PPDUs are used for the SENS NDPA and NDP, the BSS_Color parameter in the PHY header (HE SIG-A1) is set as 0.

Figure 24:
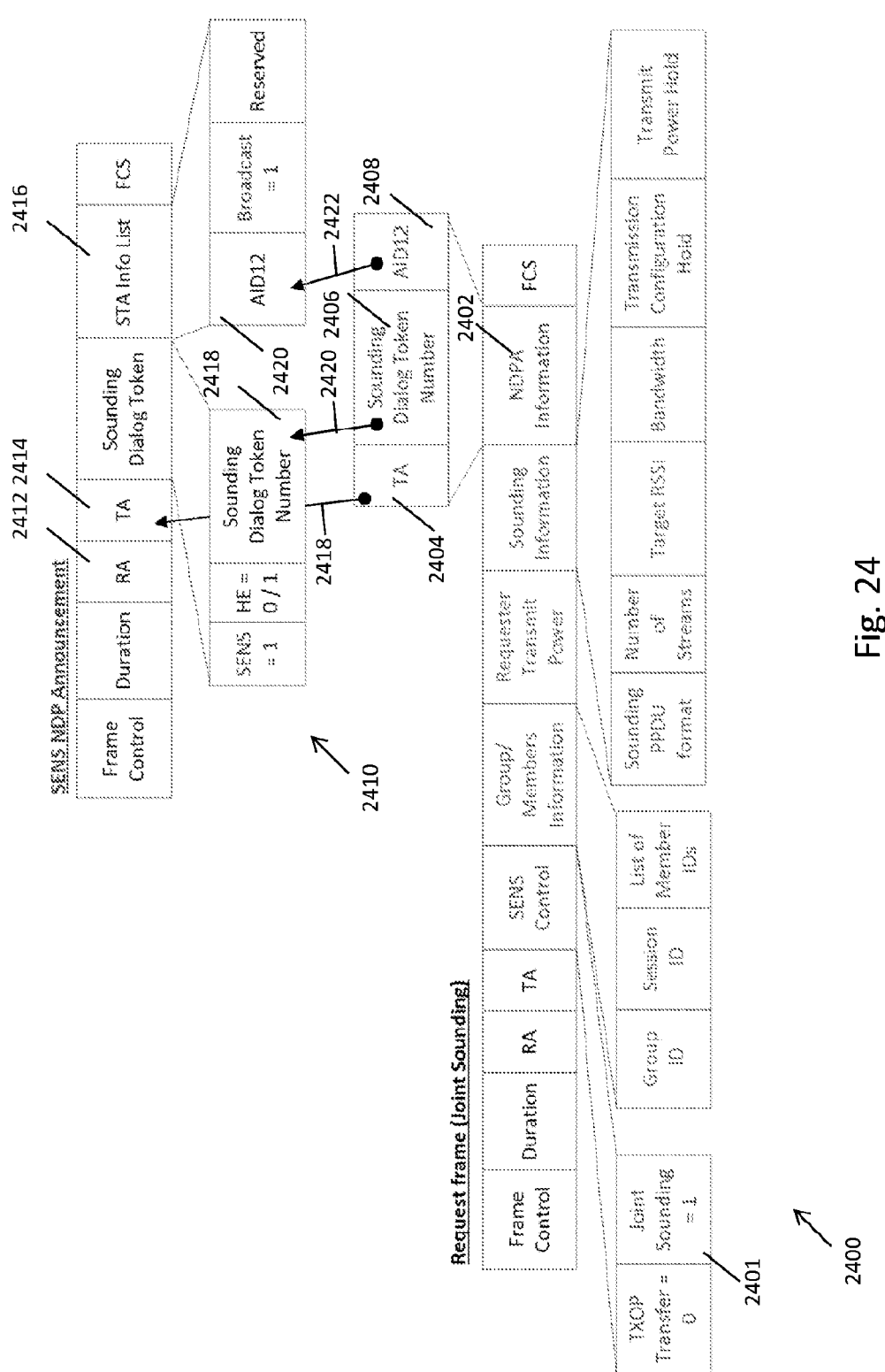
FIG. 24 depicts an example SENS Request frame 2400 for joint sounding and coordinated channel measurements.

A variation of the Sounding request frame, e.g. from that in FIG. 11A, is defined and used as a SENS Request Trigger frame to request another 11bf device to perform joint sounding. FIG. 24 depicts an example SENS Request Trigger frame 2400 for joint sounding and coordinated channel measurements. The SENS Request Trigger frame 2400 comprises a Frame Control field, a Duration field, a RA field, a TA field and a SENS Control field, a Group/Members Information field, a Request Transmit Power field, a Sounding Information, a NDPA Information field 2402 and a FCS field.

The RA field is set to the Broadcast MAC Address if more than one Transmitters are addressed, else set to the RA of the other Transmitter participating in the Joint Sounding. The SENS Control field comprises a TXOP Transfer field which is set to 0 and a Joint Sounding field 2401 which is set to 1 to indicate joint sounding. The Group/Members Information field 2206 comprises a Group ID field, a Session ID field and a List of Member IDs field. The Group ID field indicate the Group ID associated with the Sensing Group if one exist; otherwise the Group ID field is reserved. If more than one Transmitters are addressed, the "List of Member of IDs" field indicates the Members IDs of the Transmitters involved in the Joint sounding. The Requester Transmit Power field indicates the transmit power to be used for the Joint Sounding PPDU.

The Sounding Information field indicates information for Joint Sounding PPDU and comprises a Sounding PPDU Format field, a Number of Streams field, a Target RSSI field, a Bandwidth field, a Transmission Configuration Hold field and a Transmit Power Hold field. The Target RSSI field is reserved for joint sounding.

The NDPA Information field 2402 is present if the Joint Sounding field 2401 is set to 1. The NDPA Information field 2402 comprises a TA field 2404, and a Sounding Dialog Token Number field 2406 and an AID12 field 2408 which carry information to be used for subsequent NDPA frames like 2410 (which is same as the SENS NDPA 2316 & 2318 in FIG. 23) transmitted by all sensing transmitters.

In particular, a SENS NDP Announcement frame 2410 for joint sounding comprises a Frame Control field, a Duration field, a RA field 2412, a TA field 2414, a Sounding Dialog Token, a STA Info List field 2416 and a FCS field. The Sounding Dialog Token field further comprises a SENS field which is set to 0, a HE field which is set to either 0 or 1, and a Sounding Dialog Token Number field 2418. The STA Info List field 2416 further comprises an AID12 field and a Broadcast field which is set to 1. If the sensing transmitter that transmits the Request frame 2400 also participates in the transmission of the Sounding PPDU, the TA field 2404 is set as the MAC Address of the sensing transmitter, else it may be set to one of other sensing transmitters.

The TA field 2414, the Sounding Dialog Token Number field 2418 and the AID12 field 2420 of the SNES NDPA frame 2410 may correspond to the TA field 2404, the Sounding Dialog Token Number field 2406 and the AID12 field 2408 of the SENS Request Triger frame 2400, as indicated by arrows 2418, 2420, 2422.

In the following paragraphs, a sixth embodiment of the present disclosure is explained with reference to coordinated channel measurements which in turn are used for WLAN sensing.

According to the sixth embodiment of the present disclosure, a 11bf capable STA may also be able to perform WLAN sensing with non-11bf devices that do not support the WLAN sensing capabilities. This can be achieved by (i) performing channel measurements based on passively listening to Beacon, Data frames transmitted by the non-11bf devices; (ii) by getting the non-11bf devices to sound the channel for other purpose, e.g. implicit beamforming feedback (.11n), TB sounding for ranging (.11az) etc. and performing channel measurements based on received sounding frames; or (iii) by eliciting (compressed/non-compressed) beamforming feedbacks (.11n, 11ac, 11ax) and using the feedbacks as results of channel measurements. This mode of WLAN sensing with non-11bf devices may be restricted to 802.11 STAs that are part of the same BSS. Such a non-11bf device may be called non-WLAN Sensing Responder. Other WLAN Sensing Passive Receivers that can hear the channel measurement exchanges, may also make use of the Sounding frames, or the beamforming feedback frames to perform opportunistic WLAN Sensing.

FIG. 25A depicts a flow chart illustrating communications between an 802.11bf capable STA and a non-802.11bf capable STA for WLAN sensing. In this example, a 11bf capable 11n STA1 as sensing requester 2502 gets another 11n STA2 (not 11bf capable) as sensing responder 2504 to sound the channel (via implicit beamforming) and uses the Sounding PPDU to measure the channel. Contention-based channel access procedure, e.g. EDCA procedure, is illustrated by block 2506. The sensing requester 2502 transmits a HT frame 2508 to the non-11bf capable sensing responder 2504. The HT frame 2508 has its Training Request (TRQ) bit set to 1 to request the responder to transmit a sounding PPDU. After the last symbol of the HT frame 2508 is transmitted, the sensing responder 2504 then transmit a HT Sounding PPDU 2510 to the sensing requester 2502 after a SIFS. Subsequently, the sensing requester 2502 perform channel measurements based on the received HT Sounding PPDU 2510.

FIG. 25B depicts a flow chart illustrating communications between an 802.11bf capable STA and two non-802.11bf capable STA for WLAN sensing. In this example, a 11bf capable 11ac STA1 as sensing requester 2522 sounds the channel (via explicit beamforming) and collects compressed beamforming feedback from two 11ax (not 11bf capable) STAs, e.g. STA2 2524, STA3 2526, and uses the beamforming feedbacks as results of channel measurements. Contention-based channel access procedure, e.g. EDCA procedure, is illustrated by block 2528. The sensing requester 2522 transmits a VHT Announcement frame 2530 simultaneously to the non-11bf capable sensing responders 2524, 2526. After the last symbol of the VHT Announcement frame 2530 is transmitted, a SIFS may take effect, and the sensing requester 2502 then transmit a VHT NDP 2534 simultaneously to the sensing responders 2524, 2526. After the last symbol of the VHT NDP 2534 is transmitted, a SIFS may take effect, and the sensing responder 1 2524 then transmit a VHT Compressed Beamforming frame 2538 to the sensing requester 2522 after a SIFS. The sensing requester 2522 uses the feedback, i.e. the VHT Compressed Beamforming frame 2538 from the sensing responder 1 2524 as result of channel measurements of sensing responder 1 2524.

After the last symbol of the VHT Compressed Beamforming frame 2538 is transmitted, a SIFS may take effect, and the sensing requester 2522 then transmit a Beamforming Report Poll 2542 to the sensing responder 2 2526. After the last symbol of the Beamforming Report Poll 2542 is transmitted, the sensing responder 2 2526 then transmits a VHT Compressed Beamforming frame 2456 after a SIFS. The sensing requester 2522 uses the feedback, i.e. the VHT Compressed Beamforming frame 2538 from the sensing responder 2 2526 as result of channel measurements of sensing responder 2 2526.

In an embodiment, a sensing requester like STA1 2502, 2522 in FIGS. 25A and 25B may comprise a MAC interface comprising a primitive, e.g. MLME-Legacy-Sensing.request(Responder MAC Address, Feedback Type, List of STA Info, Bandwidth, Channel Matrix Type), whose purpose is to initiate legacy channel measurement procedure. Such primitive may be issued by higher layer applications and passed from the higher layer applications to the sensing requester like STA1 2502, 2522 to trigger implicit beamforming feedback as illustrated in FIG. 25A or explicit beamforming feedback as illustrated in FIG. 25B. Upon receipt of the primitive, the MLME of the sensing requester initiates either the implicit or explicit beamforming feedback sequence in the requested format. The results of channel measurements are passed up to the higher layer applications using MLME-Sensing.confirm primitive. More details on the parameters included in the MLME-Legacy-Sensing.request( )primitive can be found in Table 6.

Figure 26A:
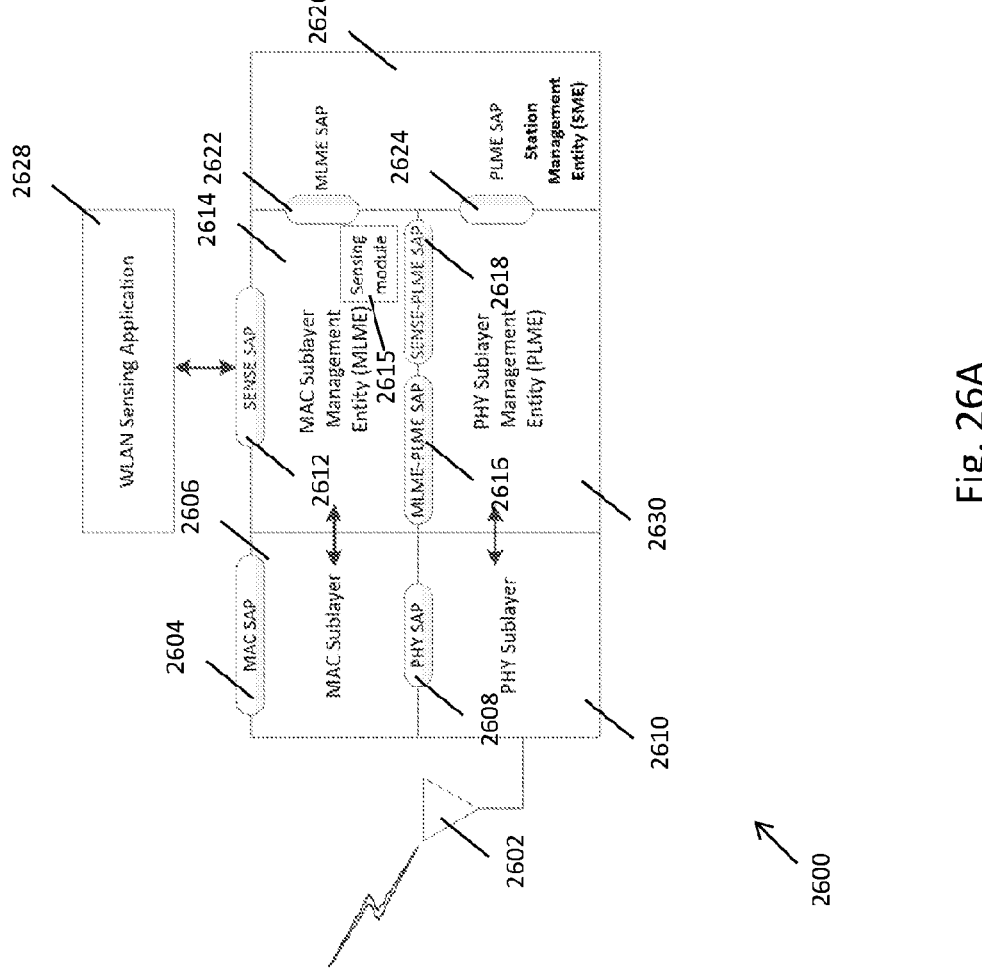
FIGS. 26A-C show example configurations of a communication apparatus, for example a sensing requester or a sensing transmitter or a sensing responder or a sensing receiver, according to the present disclosure.

FIG. 26A shows an example configuration of a communication apparatus 2600 may be implemented as a sensing requester, or a sensing receiver or a sensing transmitter and configured for WLAN sensing in accordance with the present disclosure. The communication apparatus may include at least one antenna 2602 for transmission and receipt of signals (for the sake of simplicity, only one antenna is shown in FIG. 26A). The communication apparatus may include a MAC Sublayer 2606 and a PHY Sublayer 2610. Both MAC and PHY layers include respective management entities called the MAC Sublayer Management Entity (MLME) 2614 and PHY Sublayer Management Entity (PLME) 2630. These entities provide layer management service interfaces such as SENSE service access point (SAP) 2612 and MLME-PLME SAP 2616 through which defined primitives are exchanged to pass information and layer management functions such as WLAN sensing may be invoked. In this example, a dedicated SENSE-PLME-SAP 2618 may be defined and used for exchanging primitives between MLME and PLME; alternatively, the existing PLME-SAP may be enhanced for the same functions and purposes. The MLME 2614 may further comprise a sensing module 2615 configured to perform channel measurements.

The communication apparatus further comprises a layer-dependent entity Station Management Entity (SME) which perform functions on behalf of general system management entities and would implement standard management protocol such as to ensure correct MAC operation. The layer-dependent entity 2626 provides interfaces such as MLME SAP 2622 and PLME SAP 2624 for exchanging primitives and communicating with MLME and PLME, respectively.

The communication apparatus comprises higher layer applications such as WLAN Sensing Application 2628. The higher layer applications communicate with MLME by exchanging primitives though a dedicated SENSE SAP 2612 interface or an existing MLME-SAP that is enhanced for the same functions and purposes.

For channel measurements, the higher layer applications may request the MLME 2614, e.g. using MLME-Sensing.request primitive, through SENSE SAP 2612 to initiate channel measurement. The information included in the request can be found in Tables 2, 4 and 6 for solicited channel measurements, unsolicited channel measurements and solicited legacy channel measurements respectively. The MLME 2614 may pass the information or WLAN sensing related PHY parameters to PLME through the MLME-PLME SAP 2616 and SENSE-PLME SAP 2618 for the PHY Sublayer 2610 to pack and form a physical layer protocol data unit (PPDU), e.g. Sounding PPDU (NDP), PPDU comprising a Request frame or an Announcement frame. The PPDU is then transmitted to one or more peer communication apparatuses via at least one radio transmitter (not shown) through the antenna 2602.

Upon receipt of response PPDU, e.g. Response PPDUs, Sounding PPDUs or NDPs from the one or more peer communication apparatus, the PPDUs are unpacked in the PHY Sublayer 2610 and passed the information related to the received PPDU from PLME 2630 to the MLME 2614 through the SENSE-PLME SAP 2618. The Sensing module 2615 may then perform channel measurements based on the information of the received PPDUs. Subsequently, the MLME 2614 may notify the WLAN Sensing Application 2628 via the SME 2626 of the results of the channel measurements through MLME SAP 2622, or directly through the SENSE SAP 2612. The information included in the notification to SME can be found in Table 3.

Figure 26B:
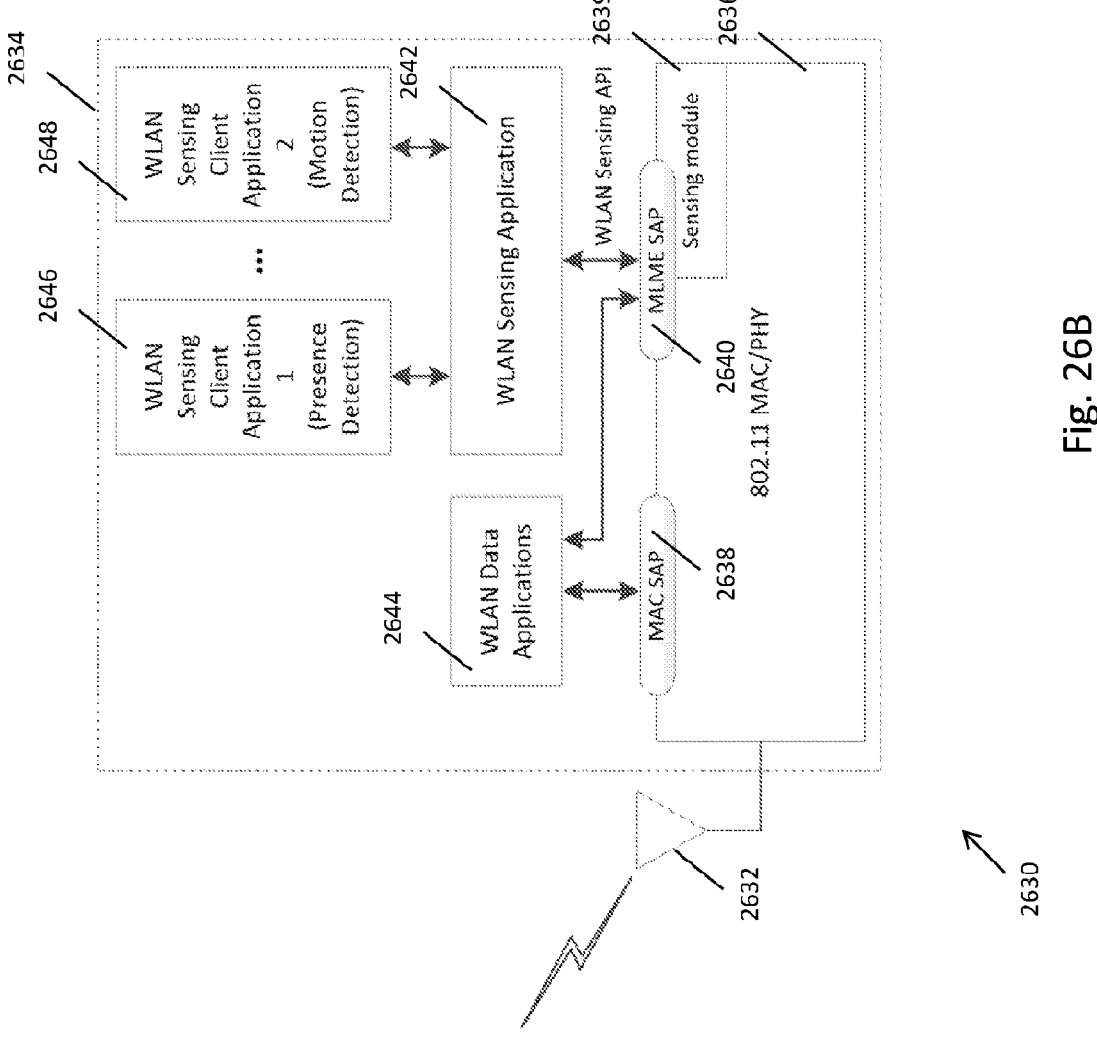

For simple use cases/deployments, the entire WLAN sensing platform may be implemented on a single communication apparatus. FIG. 26B shows another example configuration of a communication apparatus 2600 with entire WLAN sensing platform 2634 implemented within according to the present disclosure. The communication apparatus may include at least one antenna 2602 for transmission and receipt of signals (for the sake of simplicity, only one antenna is shown in FIG. 26B). Similar to the communication apparatus 2600 in FIG. 26A, the communication apparatus 2600 may comprise 802.11 MAC/PHY sublayers 2636 comprising a Sensing module 2639 for channel measurements; layer management service interfaces such as MLME SAP 2640 and MAC SAP 2638 through which defined primitives are exchanged to pass information and layer management functions such as WLAN sensing may be invoked; and higher layer applications (e.g. WLAN Sensing Application) 2642 communicating with the 802.11 MAC/PHY 2636 through MLME SAP 2640.

Further, the 802.11 MAC/PHY sublayers 2636 may communicate with WLAN Data Applications 2644 through MAC SAP 2638 and MLME SAP 2640. In this example, the Sensing module 2639 performs channel measurements and provides raw results to WLAN Sensing Application 2642 via WLAN Sensing API. The WLAN Sensing Application 2642 collects and consolidates the channel measurement results from 802.11 device and may process the results (e.g. smoothing compression etc) before passing the processed results to WLAN Sensing Client Applications like 2646,

2648. The WLAN Sensing Client Applications like 2646, 2648 may perform WLAN Sensing based on the channel measurements (e.g. using application specific machine learning algorithms etc) and provides the results of the WLAN sensing, in this case, presence/absence of human detection and human motion detection.

Figure 26C:
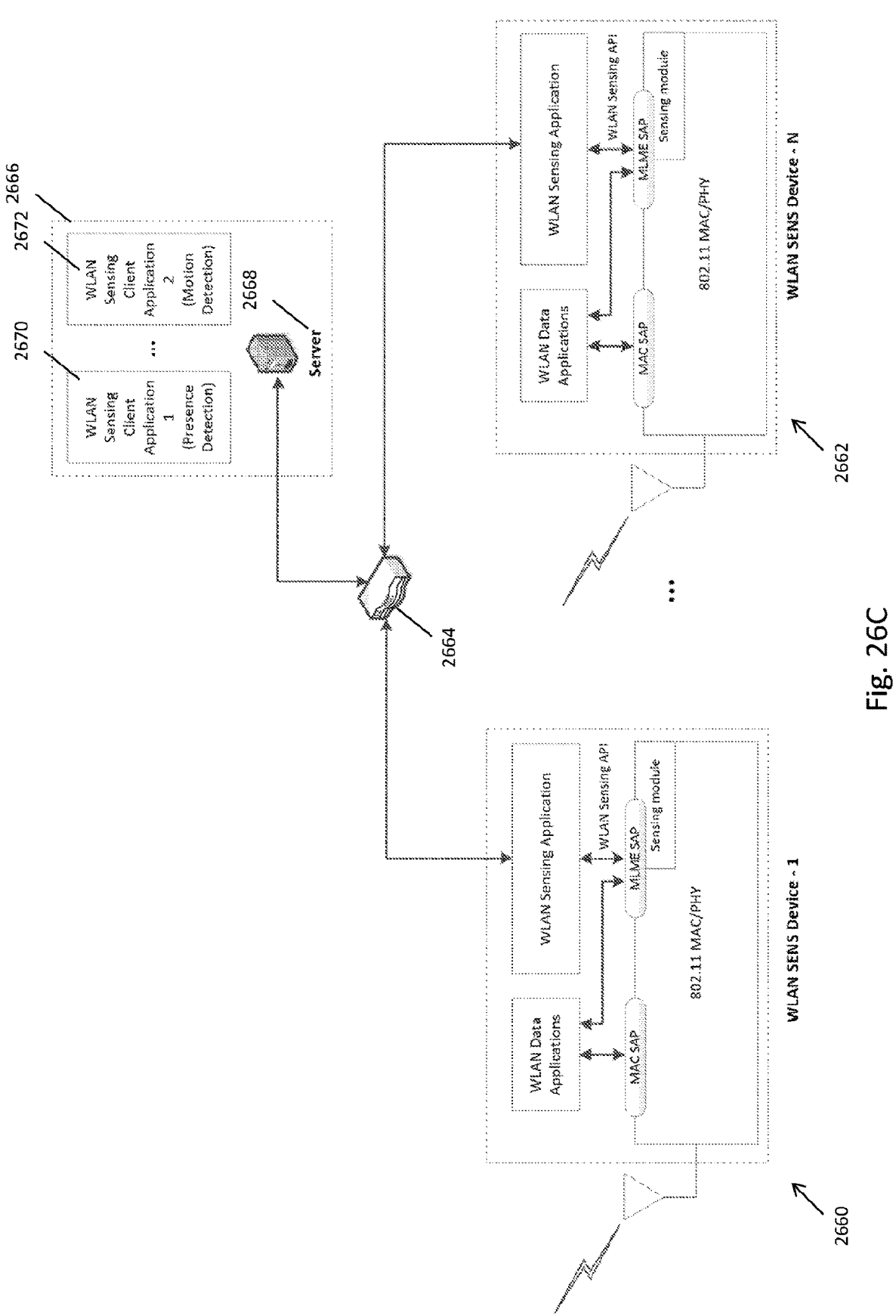

For more complex use cases or larger deployments, the WLAN Sensing platform may be implemented on a central location (e.g. a central server) using channel measurement results of multiple 802.11 devices. FIG. 26C shows another example configuration of multiple communication apparatus 2660, 2662 with WLAN sensing platform implemented on a central location according to the present disclosure. Similar to the communication apparatus 2630 in FIG. 26B, each communication apparatus like 2660, 2662 may comprise 802.11 MAC/PHY sublayers comprising a Sensing module for channel measurements; layer management service interfaces such as MLME SAP and MAC SAP through which defined primitives are exchanged to pass information and layer management functions such as WLAN sensing may be invoked; and higher layer applications (e.g. WLAN Sensing Application and WLAN Data Applications) communicating with the 802.11 MAC/PHY 2636 through MLME SAP and/or MAC SAP.

The Sensing module of each of the communication apparatuses 2660, 2662 may perform channel measurements and provide raw results to respective WLAN Sensing Applications. The WLAN Sensing Applications then collect and consolidate the channel measurements results from respective 802.11 MAC/PHY sublayers, and process the results (e.g. smoothing, compression, etc) before passing the processed results to a central server 2664.

The channel measurements results are passed via a switch/router 2664 to a client server 2668 and one or more client modules 2666 running on the client server. WLAN Sensing Client Applications like 2670, 2672 of the client module 2666 then perform WLAN sensing based on the channel measurements results received by the client server 2628 to perform WLAN Sensing (e.g. using application specific ML Algorithms etc) and provide the results of the WLAN Sensing (Presence/Absence, Human Motion etc).

As described above, the embodiments of the present disclosure provide an advanced communication system, communication methods and communication apparatuses for WLAN sensing across different 802.11 devices.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g. cellular (cell) phone, smart phone), a tablet, a personal computer (PC) (e.g. laptop, desktop, netbook), a camera (e.g. digital still/video camera), a digital player (digital audio/video player), a wearable device (e.g. wearable camera, smart watch, tracking device), a game console, a digital book reader, a telehealth/telemedicine (remote health and medicine) device, and a vehicle providing communication functionality (e.g. automotive, airplane, ship), and various combinations thereof.

The communication apparatus is not limited to be portable or movable, and may also include any kind of apparatus, device or system being non-portable or stationary, such as a smart home device (e.g. an appliance, lighting, smart meter, control panel), a vending machine, and any other "things" in a network of an "Internet of Things (IoT)".

The communication may include exchanging data through, for example, a cellular system, a wireless LAN system, a satellite system, etc, and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be understood that while some properties of the various embodiments have been described with reference to a device, corresponding properties also apply to the methods of various embodiments, and vice versa.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

TABLE 2

Details of various parameters of a primitive in media access control (MAC)
interfaces to initiate solicited channel measurements according to an embodiment.

| Name | Type | Valid range | Description |
|---|---|---|---|
| Responder MAC Address | MACAddress | Any valid MAC Address | The MAC Address of the sensing responder. If response is solicited from multiple responders, or for Joint Sounding this is set to broadcast MAC address. |
| Group ID | Integer | 0-255 | Indicates the WLAN Sensing Group |
| Member ID List | List of Integers | | Indicates a list of Member IDs of one or more STAs from which response is solicited. |
| Session ID | Integer | 0-255 | ID of a sensing session |
| Sounding PPDU format | Enumeration | HT, VHT, HE, SECURE_HE | Indicates format of the Response PPDU |
| Number of Streams | Integer | 0-16 | Number of space time streams to be used for the unsolicited Sounding PPDU. |
| Bandwidth | Integer | 1-16 | Indicates the channel bandwidth to be used for the response PPDU in units of 20 MHz. |
| Request Type | Enumeration | SOLICITED_SERIAL, SOLICITED_JOINT, UNSOLICITED | Indicates whether the request is for solicited sounding (SOLICITED_SERIAL) or for Joint Sounding (SOLICITED_JOINT) or for Unsolicited Sounding (UNSOLICITED). |
| NDPA Information | Structure | | If Joint Sounding is true, this field is present and carries the information (TA. AID12) to be included in the NDPA frame. |

TABLE 3

Details of various parameters of a primitive in MAC interfaces to report results
of channel measurements according to an embodiment.

| Name | Type | Valid range | Description |
|------|------|-------------|-------------|
| Responder MAC Address | MACAddress | Any valid MAC Address | The MAC Address of the sensing responder. If response is solicited from multiple responders, this is set to broadcast MAC address. |
| Session ID | Integer | 0-255 | ID of a sensing session |
| PPDU format | Enumeration | HT, VHT, HE, SECURE_HE | Indicates format of the Response PPDU |
| Bandwidth | Integer | 1-16 | Indicates the channel bandwidth of the response PPDU in units of 20 MHz. |
| Channel Matrix Type | Enumeration | CSI, NCBFM, CBFM | Indicates the type of Channel Matrix: CSI Matrix, noncompressed beamformig feedback matrix or compressed beamformig feedback matrix |
| NumberOfSubcarriers_Ns | Integer | 1-1023 | Number of subcarriers for which channel measurements are reported |
| NumberOfColumns_Nc | Integer | 1-16 | Number of columns in the reported Channel Matrix |
| NumberOfReceiveChains_Nr | Integer | 1-16 | Number of rows in the reported Channel Matrix |
| NumberOfBitsPerElement_Nb | Integer | 1-16 | Number of bits used for each complex element of the Channel Matrix |
| ChannelMatrix | Matrix | | CSI Matrix ($H_{eff}$), or noncompressed beamformig feedback matrix or compressed beamformig feedback matrix as defined in 802.11n specification. |
| SNRList | List | | List of Signal-to-noise ratio (SNR) in the Nr receiver chains (8 bits per chain). |

TABLE 4

Details of various parameters of a primitive in MAC interfaces to start
unsolicited channel measurements on a periodic basis according to an embodiment.

| Name | Type | Valid range | Description |
|------|------|-------------|-------------|
| PPDU format | Enumeration | HT, VHT, HE, SECURE_HE | Indicates format of the unsolicited Sounding PPDU |
| Bandwidth | Integer | 1-16 | Indicates the channel bandwidth to be used for the unsolicited Sounding PPDU in units of 20 MHz. |
| Number of Streams | Integer | 0-16 | Number of space time streams to be used for the unsolicited Sounding PPDU. |
| SoundingPeriod | Integer | >=1 | The duration (in Time Units (TUs)) between transmissions of two unsolicited Sounding PPDUs. |

TABLE 5

Details of a physical (PHY) parameter(s) of a primitive in PHY interfaces to
report results of channel measurements to MAC layer according to an embodiment.

| Name | Type | Valid range | Description |
|------|------|-------------|-------------|
| CHAN_MAT_TYPE | Enumeration | COMPRESSED_SV, NON-COM-PRESSED_SV, CSI_MATRICES | Indicates format used for the CHAN_MAT parameter in the RXVECTOR: COMPRESSED_SV indicates that CHAN_MAT is |

TABLE 5-continued

Details of a physical (PHY) parameter(s) of a primitive in PHY interfaces to
report results of channel measurements to MAC layer according to an embodiment.

| Name | Type | Valid range | Description |
|------|------|-------------|-------------|
| | | | a set of compressed beamforming vector matrices. NON_COM-PRESSED_SV indicates that CHAN_MAT is a set of noncompressed beamforming vector matrices. CSI_MATRICES indicates that CHAN_MAT is a set of channel state matrices. |

TABLE 6

Details of various parameters of a primitive in MAC interfaces to initiate legacy
channel measurements procedure according to an embodiment.

| Name | Type | Valid range | Description |
|------|------|-------------|-------------|
| Responder MAC Address | MACAddress | Any valid MAC Address | The MAC Address of the sensing responder. If response is solicited from multiple responders, this is set to broadcast MAC address. |
| Feedback Type | Enumeration | IMPLICIT, EXPLICIT_HT, EXPLICIT_VHT, EXPLICIT_HE | Indicates implicit beamforming (11n only) or explicit beamforming (11n, 11ac, 11ax). |
| List of STA Info | List | | Only present when Feedback Type is EXPLICIT_VHT or EXPLICIT_HE and contain the list of STA Info to be included in the VHT or HE NDP Announcement frame. The format is as defined in the 802.11ac and 802.11ax specification and indicates the list of STAs from whom beamforming feedbacks are solicited. |
| Bandwidth | Integer | 1-16 | Indicates the channel bandwidth to be used for the unsolicited Sounding PPDU in units of 20 MHz. |
| Channel Matrix Type | Enumeration | CSI_MATRICES, NON_COMPRESSED_SV, COMPRESSED_SV | Indicates the type of Channel Matrix: CSI Matrix, noncompressed beamformig feedback matrix or compressed beamformig feedback matrix |

The invention claimed is:

1. A communication apparatus comprising:

a transmitter, which, in operation, transmits a request frame to one or more peer communication apparatuses, the request frame carrying (i) transmission parameters to be used by each of the one or more peer communication apparatuses to transmit a Null Data Packet (NDP), and (ii) a session identifier identifying a sensing session, wherein the transmitter, in operation, transmits another frame carrying the session identifier to the one or more peer communication apparatuses, the another frame soliciting each of the one or more peer communication apparatuses to transmit the NDP;

circuitry, which, in operation, performs channel measurements based on the respective NDP(s) received from the one or more peer communication apparatuses; and an interface, which, in operation, obtains sensing parameters from higher layer applications and pass a result of the channel measurements to the higher layer applications.

2. The communication apparatus of claim 1, wherein the NDP(s) received from the one or more peer communication apparatuses used for channel measurements is transmitted using a same PPDU format and a same channel bandwidth as a request PPDU comprising the request frame.

3. The communication apparatus of claim 1, wherein the transmission parameters comprise at least one of: a group identifier, respective identifier(s) of the one or more peer communication apparatuses, a PPDU format, a number of spatial streams, a channel bandwidth, a target receive power and a transmit power.

4. The communication apparatus of claim 1, wherein the request frame further comprises a Transmit Power Hold field that indicates to one or more peer communication apparatuses to transmit the NDP(s) using a same transmit power during the sensing session.

5. The communication apparatus of claim 1, wherein the transmission parameters are negotiated with the one or more communication apparatus during a setup of the sensing session.

6. The communication apparatus of claim 1, wherein the interface comprises a primitive to request for a transmission of the request frame to the one or more peer communication apparatuses, and pass, from the higher layer applications: a group identifier, the session identifier, respective identifier(s) of the one or more peer apparatus or a media access control address of one of the one or more peer communication apparatuses, a PPDU format, a number of spatial streams and a channel bandwidth.

7. The communication apparatus of claim 1, wherein the interface comprises a primitive to pass, to the higher layer applications: the session identifier, a media access control address of one of the one or more peer communication apparatuses, a PPDU format, a channel bandwidth and the result of the channel measurements.

8. The communication apparatus of claim 1, wherein the circuitry, in operation, performs channel measurements on a periodic basis based on unsolicited PPDUs received from at least one of the one or more peer communication apparatuses.

9. The communication apparatus of claim 8, wherein each of the at least one of the one or more peer communication apparatuses is identified by a transmitter address field of a frame received immediately prior to the unsolicited PPDU.

10. The communication apparatus of claim 1, wherein the interface comprises a primitive to request the one or more peer communication apparatuses to initiate a legacy channel measurement procedure.

11. The communication apparatus of claim 1, wherein the session identifier is assigned to at least two different peer communication apparatuses.

12. The communication apparatus of claim 1, wherein the transmitter, in operation, transmits the request frame at least twice during one sensing session.

13. A communication method comprising:

obtaining sensing parameters from higher layer applications;

transmitting a request frame to one or more peer communication apparatuses, the request frame carrying (i) transmission parameters to be used by each of the one or more peer communication apparatuses to transmit a Null Data Packet (NDP), and (ii) a session identifier identifying a sensing session;

transmitting another frame carrying the session identifier to the one or more peer communication apparatuses, the another frame soliciting each of the one or more peer communication apparatuses to transmit the NDP;

performing channel measurements based on the respective NDP(s) received from the one or more peer communication apparatuses; and passing a result of the channel measurements to the higher layer applications.

14. The communication method of claim 13, wherein the session identifier is assigned to at least two different peer communication apparatuses.

15. The communication method of claim 13, wherein the request frame is transmitted at least twice during one sensing session.

\* \* \* \* \*